United States Patent
Balakshin et al.

(10) Patent No.: US 10,240,006 B2
(45) Date of Patent: Mar. 26, 2019

(54) UPGRADING LIGNIN FROM LIGNIN-CONTAINING RESIDUES THROUGH REACTIVE EXTRACTION

(71) Applicant: RENMATIX, INC., King of Prussia, PA (US)

(72) Inventors: Mikhail Y. Balakshin, Wayne, PA (US); Ewellyn A. Capanema, Wayne, PA (US); Manuk Colakyan, Ardmore, PA (US); Francis Lipiecki, Haddonfield, NJ (US)

(73) Assignee: Renmatix, Inc., King of Prussia, PA (US)

( * ) Notice: Subject to any disclaimer, the term of this patent is extended or adjusted under 35 U.S.C. 154(b) by 12 days.

(21) Appl. No.: 15/305,608

(22) PCT Filed: May 1, 2015

(86) PCT No.: PCT/US2015/028815
§ 371 (c)(1),
(2) Date: Oct. 20, 2016

(87) PCT Pub. No.: WO2015/168571
PCT Pub. Date: Nov. 5, 2015

(65) Prior Publication Data
US 2017/0044328 A1 Feb. 16, 2017

Related U.S. Application Data

(60) Provisional application No. 61/987,270, filed on May 1, 2014, provisional application No. 62/011,879, filed on Jun. 13, 2014.

(51) Int. Cl.
C08H 8/00 (2010.01)
C08H 7/00 (2011.01)
(Continued)

(52) U.S. Cl.
CPC ............. *C08H 6/00* (2013.01); *C07G 1/00* (2013.01); *C08B 37/0057* (2013.01); *C08H 8/00* (2013.01)

(58) Field of Classification Search
CPC .... C08H 6/00; C08H 8/00; C07G 1/00; C08B 37/0057
See application file for complete search history.

(56) References Cited

U.S. PATENT DOCUMENTS

| 1,806,703 A | 5/1931 | Gesellschaft |
| 1,816,394 A | 7/1931 | Albert |

(Continued)

FOREIGN PATENT DOCUMENTS

| AU | 779714 B2 | 2/2005 |
| AU | 2015252877 | 5/2015 |

(Continued)

OTHER PUBLICATIONS

Qian, Yejian, et al. "Structural analysis of bio-oils from sub-and supercritical water liquefaction of woody biomass." Energy 32.3 (2007): 196-202. (Year: 2007).*

(Continued)

*Primary Examiner* — Nicholas E Hill
(74) *Attorney, Agent, or Firm* — Ballard Spahr LLP (57) ABSTRACT

Disclosed are methods of functionalizing lignin using reactive extraction. The invention also generally relates to functionalized lignin. An exemplary method for producing functionalized lignin is disclosed, which comprises: providing a residue comprising lignin and cellulose; subjecting the residue to a liquid comprising an organic compound, thereby forming a first mixture; wherein the subjecting is performed at a first temperature of about 100° C. or less; and wherein the first mixture comprises: a first liquid fraction comprising solubilized functionalized lignin, wherein the solubilized (Continued)

functionalized lignin is functionalized with the organic compound; and a first solid fraction comprising cellulose.

21 Claims, 3 Drawing Sheets

(51) Int. Cl.
   *C07G 1/00* (2011.01)
   *C08B 37/00* (2006.01)

(56) References Cited

U.S. PATENT DOCUMENTS

| | | |
|---|---|---|
| 2,106,797 A | 2/1938 | Henry |
| 2,190,909 A | 2/1940 | Max et al. |
| 2,380,448 A | 7/1945 | Raphael |
| 2,645,633 A | 7/1953 | Richmond et al. |
| 4,017,474 A | 4/1977 | Glasser et al. |
| 4,746,401 A | 5/1988 | Roberts et al. |
| 4,803,255 A | 2/1989 | Pruett et al. |
| 4,966,650 A | 10/1990 | DeLong et al. |
| 5,512,276 A | 4/1996 | Lang et al. |
| 5,614,564 A | 3/1997 | Hwang et al. |
| 5,769,934 A | 6/1998 | Ha et al. |
| 5,770,010 A | 6/1998 | Jelks |
| 6,117,925 A | 9/2000 | Tomka |
| 6,172,204 B1 | 1/2001 | Sarkanen et al. |
| 6,962,725 B2 | 11/2005 | McFadden, Sr. et al. |
| 7,985,847 B2 | 7/2011 | Belanger et al. |
| 7,988,788 B2 | 8/2011 | Hilst |
| 8,057,639 B2 | 11/2011 | Pschorn et al. |
| 8,603,295 B2 | 12/2013 | Dottori et al. |
| 8,663,392 B2 | 3/2014 | Zhang |
| 8,673,027 B2 | 3/2014 | Kleinert et al. |
| 2002/0028857 A1 | 3/2002 | Holy |
| 2007/0143932 A1 | 6/2007 | Buchert et al. |
| 2007/0219141 A1 | 9/2007 | Jones et al. |
| 2008/0032344 A1 | 2/2008 | Fallavollita |
| 2008/0202504 A1 | 8/2008 | Hilst |
| 2009/0176286 A1 | 7/2009 | O'Connor et al. |
| 2010/0269990 A1 | 10/2010 | Dottori et al. |
| 2010/0317070 A1 | 12/2010 | Agaskar |
| 2011/0071238 A1 | 3/2011 | Bastioli et al. |
| 2012/0012035 A1 | 1/2012 | Blank et al. |
| 2012/0161060 A1 | 6/2012 | Homan et al. |
| 2013/0085269 A1 | 4/2013 | Delmas et al. |
| 2013/0134351 A1 | 5/2013 | Bathurst |
| 2013/0167603 A1 | 7/2013 | Bathurst et al. |
| 2013/0172628 A1 | 7/2013 | Berlin et al. |
| 2013/0338347 A1 | 12/2013 | Cao et al. |
| 2014/0030524 A1 | 1/2014 | Kadam et al. |
| 2014/0066608 A1 | 3/2014 | Dorgan et al. |
| 2014/0121360 A1 | 5/2014 | Cao et al. |
| 2014/0170713 A1* | 6/2014 | Retsina .................. C13K 1/02 435/99 |
| 2014/0227742 A1 | 8/2014 | Bao et al. |
| 2014/0275501 A1 | 9/2014 | Capanema et al. |
| 2014/0288285 A1 | 9/2014 | Ters et al. |
| 2014/0311201 A1 | 10/2014 | Bathurst |
| 2015/0122429 A1 | 5/2015 | Dybov et al. |
| 2015/0259369 A1 | 9/2015 | McKellar |

FOREIGN PATENT DOCUMENTS

| | | |
|---|---|---|
| AU | 2015252877 | 11/2015 |
| BR | 1120160253132 | 5/2015 |
| BR | 1120160253132 | 10/2016 |
| CA | 1097617 A | 3/1981 |
| CA | 1267407 B | 4/1990 |
| CA | 1282777 C | 4/1991 |
| CA | 2944905 | 5/2015 |
| CA | 2944905 | 10/2016 |
| CN | 101274946 A | 10/2008 |
| CN | 102604121 A | 7/2012 |
| CN | 103131017 A | 6/2013 |
| CN | 103435817 A | 12/2013 |
| CN | PCT/US2015/028815 | 5/2015 |
| CN | 201580024461.5 | 10/2016 |
| EP | 0098490 A2 | 1/1984 |
| EP | 1397186 A2 | 3/2004 |
| EP | PCT/US2015/028815 | 5/2015 |
| EP | 15786717.7 | 11/2016 |
| GB | 2000822 A | 1/1979 |
| IN | 201637037271 | 5/2015 |
| IN | 201637037271 | 10/2016 |
| JP | 2016-565043 | 5/2015 |
| JP | 2016-565043 | 10/2016 |
| KR | 10-2016-7031623 | 5/2015 |
| KR | 10-2016-7031623 | 11/2016 |
| NZ | 725350 | 5/2015 |
| NZ | 725350 | 10/2016 |
| RU | 2270218 C1 | 2/2006 |
| SG | PCT/US2015/028815 | 5/2015 |
| SG | 11201608431 U | 10/2016 |
| WO | WO-1995/025846 A1 | 9/1995 |
| WO | WO-1996/025553 A1 | 8/1996 |
| WO | WO-2005/053812 A1 | 6/2005 |
| WO | WO-2010/034055 A1 | 4/2010 |
| WO | WO-2011/054892 A1 | 5/2011 |
| WO | WO-2011/091044 A1 | 7/2011 |
| WO | WO-2012/010401 A2 | 1/2012 |
| WO | WO-2012/109651 A1 | 8/2012 |
| WO | WO-2013/101397 A1 | 7/2013 |
| WO | WO-2013/164234 A1 | 11/2013 |
| WO | WO-2013/170236 A1 | 11/2013 |
| WO | WO-2013/170237 A1 | 11/2013 |
| WO | WO-2013/170238 A1 | 11/2013 |
| WO | WO-2013/170239 A1 | 11/2013 |
| WO | WO-2014/012030 A1 | 1/2014 |
| WO | WO-2014/070821 A1 | 5/2014 |
| WO | WO-2014/070830 A1 | 5/2014 |
| WO | WO-2014/094104 A1 | 6/2014 |
| WO | WO-2014/144746 A1 | 9/2014 |
| WO | PCT/US2015/028815 | 5/2015 |
| WO | WO-2016/076845 A1 | 5/2016 |

OTHER PUBLICATIONS

International Search Report and Written Opinion dated May 1, 2015, for application PCT/US2015/028815, filed on Aug. 11, 2015 (Applicant—Renmatix, Inc. // Inventor—Balakshin, et al.) (16 pages).

Baker, D. and T. Rials (2013), "Recent Advances in Low-Cost Carbon Fiber Manufacture from Lignin," Journal of Applied Polymer Science DOI: 10.1002/APP.39273 (16 pages).

Balakshin and Capanema et al. (2015) "Structural analysis of hardwood native lignins by quantitative 13C NMR spectroscopy," Holzforschung (15 pages).

Capanema and Jameel et al. (2005) Proc. 13th ISWFPC, Auckland, New Zealand, v.III, 57-64. Isolation and characterization of residual lignins from hardwood pulps: Method improvements, (9 pages).

Capanema and Kadla et al. (2005) J. Agric. Food Chem. 53, 9639-9649 "Quantitative Characterization of a Hardwood Milled Wood Lignin by NMR Spectroscopy," (11 pages).

Cazacu et al., "Polyolefin/Lignosulfonate Blends, Functionalized Polyolefin/Lignin Blends," Macromolecular Materials and Engineering 2004, 289, pp. 880-889.

Chen, et al., "Physical Properties of Lignin-Based Polypropylene Blends," Mingqiang. Polymer Composites (2011), 32(7), pp. 1019-1025.

Ebringerova, et al., "Extraction and separation of lignin and hemicelluloses from steamed wood material," Holzforschung und Holzverwertung (1993), 45(5), 93-5, 78 (Abstract Only).

Efanov, M. V. Transformations of aspen wood and its principal components by O-acylation Chemistry of Natural Compounds (Translation of Khimiya Prirodnykh Soedinenii). (2002), 37(5), 482-485.

Glasser and R. K. Jain, "Lignin Derivatives," Holzforschung 1993, 47, pp. 225-233.

Glasser, et al., "Lignin: Historical, Biological, and Materials Perspectives," ACS (1999). Lignin: historical, biological, and materials perspectives. Washington, DC, American Chemical Society (8 pages).

(56) References Cited

OTHER PUBLICATIONS

Glasser, W. (2000), "Lignin: Historical, Biological, and Material Perspectives," W. Glasser, R. Northey and T. Schultz. Washington, DC: 216-238.
Glasser, W., C. Barnett, et al. (1983), "The Chemistry of Several Novel Bioconversion Lignins," Journal of Agricultural and Food Chemistry 31(5): 921-930.
Gosselink, R., E. de Jong, et al. (2004), "Co-ordination network for lignin—standardization, production and applications adapted to market requirements (EUROLIGNIN)," Industrial Crops and Products 20: 121-129.
Heitner, et al., "The effect of acetylation on the photodegregation of milled wood lignin," Journal of Pulp and Paper Science, 2001, vol. 27, No. 10, pp. 325-329.
Holladay, J. E., J. F. White, et al. (2007). vol. II—Results of Screening for Potential Candidates from Biorefinery Lignin. Top Value-Added Chemicals from Biomass, Pacific Northwest National Laboratory (PNNL) and the National Renewable Energy Laboratory (NREL) (87 pages).
Kosikova, B.; Duris, M.; Demianova, V., "Conversion of lignin biopolymer into surface-active derivatives", European Polymer Journal (2000), 36(6), 1209-1212.
Kubo, J. F. Kadla, "Kraft lignin/poly(ethylene oxide) blends: Effect of lignin structure on miscibility and hydrogen bonding," Journal of Applied Polymer Sci. 2005, 98, pp. 1437-1444.
Kubo, J. F. Kadla, "Miscibility and Hydrogen Bonding in Blends of Poly(ethylene oxide) and Kraft Lignin," Macromolecules 2003, 36, pp. 7803-7811.
Kubo, J. F. Kadla, "Poly(Ethylene Oxide)/Organosolv Lignin Blends:? Relationship between Thermal Properties, Chemical Structure, and Blend Behavior," Macromolecules 2004, 37, pp. 6904-6911.
Li and S. Sarkanen, "Alkylated Kraft Lignin-Based Thermoplastic Blends with Aliphatic Polyesters" Macromolecules 2002, 35, pp. 9707-9715.
Li and S. Sarkanen, "Miscible Blends of Kraft Lignin Derivatives with Low-Tg Polymers," Macromolecules 2005, 38, pp. 2296-2306.
Lora, J. and W. Glasser (2002), "Recent Industrial Applications of Lignin: A Sustainable Alternative to Nonrenewable Materials," Journal of Polymers and the Environment 10(1-2): 39-48.
Mörck, R., H. Yoshida, et al. (1986), "Fractionation of Kraft Lignin by Successive Extraction With Organic Solvents," Holzforschung (pp. 51-60).
Nitz et al., "Reactive extrusion of polycaprolactone compounds containing wood flour and lignin," Journal of Applied Polymer Sci. 2001, 32, 656 (Abstract Only).
Pan, X.-J.; Sano, Y. Holzforschung (1999), "Atmospheric Acetic Acid Pulping of Rice Straw IV: Physico-Chemical Characterization of Acetic Acid Lignins from Rice Straw and Woods," 53(5), 511-518.
Pouteau, et al., "Antioxidant properties of lignin in polypropylene" Polymer Degradation and Stability 2003, 81, pp. 9-18.
Ragauskas, A.J. et al. (2014), "Lignin Valorization: Improving Lignin Processing in the Biorefinery," Science, 344: 1246843. DOI:10.1126/science.1246843 (11 pages).
Sadeghifar, et al., "Toward Thermoplastic Lignin Polymers. Part 1. Selective Masking of Phenolic Hydroxyl Groups in Kraft Lignins via Methylation and Oxypropylation Chemistries," Ind. Eng. Chem. Res. 2012, 51, pp. 16713-16720.
Toriz G, Denes F, Young RA, "Lignin-polypropylene composites. Part 1: Composites from unmodified lignin and polypropylene," Polymer Composites 23(5) (2002) pp. 806-813.
Villani, et al., "Polymer blends of steam-explosion lignin and poly(E-caprolactone) by high-energy ball milling," Journal of Applied Polymer Sci. 2008, 109, pp. 309-313.
West, et al., "Studies on lignin and related compounds LXVI, the ethanolysis of maple wood," Journal of the American Chemical Society, 1943, vol. 65, pp. 1176-1180.
International Preliminary Report and Written Opinion dated Nov. 1, 2016, for application PCT/US2015/028815, filed on Aug. 11, 2015 (Applicant—Renmatix, Inc. // Inventor—Balakshin, et al.) (10 pages).
Supplementary European Search Report dated Dec. 15, 2017 by the European Patent Office for Patent Application No. 15786717.7, which was filed on May 1, 2015 and published as EP 3137553 on Mar. 8, 2017 (Inventor—Balakshin et al.; Applicant—Renmatix, Inc.) (6 pages).
U.S. Appl. No. 62/987,270, filed May 1, 2014, Balakshin.
U.S. Appl. No. 62/011,879, filed Jun. 13, 2014, Balakshin.

\* cited by examiner

UPGRADING LIGNIN FROM LIGNIN-CONTAINING RESIDUES THROUGH REACTIVE EXTRACTION

CROSS-REFERENCE TO RELATED APPLICATIONS

This application is a U.S. National Phase Application of International Application No. PCT/US2015/028815, filed May 1, 2015, which claims priority to U.S. Provisional Application No. 61/987,270, filed May 1, 2014, and U.S. Provisional Application No. 62/011,879, filed Jun. 13, 2014, all of which are hereby incorporated by reference in their entirety.

FIELD OF THE INVENTION

The invention generally relates to methods of functionalizing lignin using a reactive extraction method. The invention also generally relates to functionalized lignin.

BACKGROUND OF THE INVENTION

The production of economical biofuel remains a challenge for many biorefineries, in part due to the failure of the industry to successfully produce and monetize lignin as a high-value product. Lignin is the second most abundant natural polymer on Earth, contributing as much as 30% of the weight and 40% of the energy content of lignocellulosic biomass, and therefore having a vast potential to replace petroleum based chemicals. Despite these facts, for most biorefineries lignin represents a low value by-product. However, if properly upgraded, lignin can be an additional revenue stream for biorefineries. In fact, Techno-Economic Analyses from NREL suggest that lignin co-products may be essential in meeting the cost target of $3.00 per gallon of gasoline equivalent by 2022. Thus there is a need in the field for methods to upgrade lignin, as well as the upgraded lignin itself, to realize additional revenue streams for lignin that is typically otherwise regarded as a byproduct.

SUMMARY OF THE INVENTION

To meet these, as well as other, needs, we have invented a unique reactive extraction process to upgrade and functionalize lignin, thereby producing a high value product and increasing the value of lignin to biorefineries, and any other processes that produce lignin, worldwide.

In some embodiments, a method is provided for producing functionalized lignin, the method comprising, consisting of, or consisting essentially of: providing a residue comprising lignin and cellulose; subjecting the residue to a liquid comprising, consisting of, or consisting essentially of an organic compound, thereby forming a first mixture; wherein the subjecting is performed at a first temperature of about 100° C. or less; and wherein the first mixture comprises, consists of, or consists essentially of: a first liquid fraction comprising solubilized functionalized lignin, wherein the solubilized functionalized lignin is functionalized with the organic compound; and a first solid fraction comprising, consisting of, or consisting essentially of cellulose.

In some embodiments, the residue is obtained from a process selected from the group consisting of enzymatic hydrolysis, acid hydrolysis, steam explosion, a treatment comprising $SO_2$, a treatment comprising $CO_2$, hydrothermal treatment, and any combination thereof. In some embodiments, the residue is obtained from a biorefinery.

In one embodiment, a unique combination of supercritical hydrolysis (SH) (to produce a residue containing functionalizable lignin), and reactive extraction (to extract and functionalize the lignin) may be used. The functionalized lignin may then be employed in a variety of applications, including, for example, thermoplastics, carbon fibers, nano carbon fibers, adhesives, and so on.

In some embodiments, a functionalized lignin is provided and comprises: an ethoxyl content of about 1 to about 45 per 100 Ar; and at least one of: 1) a phenolic OH content of less than about 70; and 2) a β-O-4 content of at least about 10.

In some embodiments, a functionalized lignin is provided and comprises: an acyl content of about 1 to about 45 per 100 Ar; and at least one of: 1) a phenolic OH content of less than about 70; and 2) a β-O-4 content of at least about 10.

In some embodiments, a functionalized lignin is provided and comprises: an acyl content of about 1 to about 45 per 100 Ar; an ethoxyl content of about 1 to about 45 per 100 Ar; and at least one of: 1) a phenolic OH content of less than about 70; and 2) a β-O-4 content of at least about 10.

BRIEF DESCRIPTION OF THE DRAWINGS

The accompanying drawings, which are included to provide a further understanding of the invention and are incorporated in and constitute a part of this specification, illustrate aspects of the invention and together with the description serve to explain the principles of the invention. In the drawings.

DETAILED DESCRIPTION OF THE INVENTION

As used throughout this disclosure, the following terms, unless otherwise indicated, shall be understood to have the following meanings.

As used herein, the singular forms "a," "an," and "the" include the plural reference unless the context clearly indicates otherwise.

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading may be combined with embodiments illustrated under any other heading.

The use of numerical values in the various quantitative values specified in this application, unless expressly indicated otherwise, are stated as approximations as though the minimum and maximum values within the stated ranges were both preceded by the word "about." In this manner, slight variations from a stated value can be used to achieve substantially the same results as the stated value. Also, the disclosure of ranges is intended as a continuous range including every value between the minimum and maximum values recited as well as any ranges that can be formed by such values. Also disclosed herein are any and all ratios (and ranges of any such ratios) that can be formed by dividing a recited numeric value into any other recited numeric value. Accordingly, the skilled person will appreciate that many such ratios, ranges, and ranges of ratios can be unambiguously derived from the numerical values presented herein and in all instances such ratios, ranges, and ranges of ratios represent various embodiments of the present invention.

A supercritical fluid is a fluid at a temperature above its critical temperature and at a pressure above its critical pressure. A supercritical fluid exists at or above its "critical point," the point of highest temperature and pressure at which the liquid and vapor (gas) phases can exist in equilibrium with one another. Above critical pressure and critical temperature, the distinction between liquid and gas phases disappears. A supercritical fluid possesses approximately the penetration properties of a gas simultaneously with the solvent properties of a liquid. Accordingly, supercritical fluid extraction has the benefit of high penetrability and good solvation.

Reported critical temperatures and pressures include: for pure water, a critical temperature of about 374.2° C., and a critical pressure of about 221 bar; for carbon dioxide, a critical temperature of about 31° C. and a critical pressure of about 72.9 atmospheres (about 1072 psig). Near-critical water has a temperature at or above about 300° C. and below the critical temperature of water (374.2° C.), and a pressure high enough to ensure that all fluid is in the liquid phase. Sub-critical water has a temperature of less than about 300° C. and a pressure high enough to ensure that all fluid is in the liquid phase. Sub-critical water temperature may be greater than about 250° C. and less than about 300° C., and in many instances sub-critical water has a temperature between about 250° C. and about 280° C. The term "hot compressed water" is used interchangeably herein for water that is at or above its critical state, or defined herein as near-critical or sub-critical, or any other temperature above about 50° C. (e.g., at least about 100° C., or at least about 150° C.) but less than subcritical and at pressures such that the water (e.g., all of the water) is in a liquid state As used herein, a fluid which is "supercritical" (e.g., supercritical water, supercritical $CO_2$, etc.) indicates a fluid which would be supercritical if present in pure form under a given set of temperature and pressure conditions. For example, "supercritical water" indicates water present at a temperature of at least about 374.2° C. and a pressure of at least about 221 bar, whether the water is pure water, or present as a mixture (e.g., water and ethanol, water and $CO_2$, etc.). Thus, for example, "a mixture of sub-critical water and supercritical carbon dioxide" indicates a mixture of water and carbon dioxide at a temperature and pressure above that of the critical point for carbon dioxide but below the critical point for water, regardless of whether the supercritical phase contains water and regardless of whether the water phase contains any carbon dioxide. For example, a mixture of sub-critical water and supercritical $CO_2$ may have a temperature of about 250° C. to about 280° C. and a pressure of at least about 225 bar.

As used herein, "continuous" indicates a process which is uninterrupted for its duration, or interrupted, paused or suspended only momentarily relative to the duration of the process. Treatment of biomass is "continuous" when biomass is fed into the apparatus without interruption or without a substantial interruption, or processing of said biomass is not done in a batch process.

As used herein, "resides" indicates the length of time which a given portion or bolus of material is within a reaction zone or reactor vessel. The "residence time," as used herein, including the examples and data, are reported at ambient conditions and are not necessarily actual time elapsed.

As used herein with respect to biomass, "steam exploding" means a thermomechanochemical process used to breakdown the structural components of the biomass aided by heat in the form of steam (thermo), shear forces due to the expansion of moisture (mechano), and hydrolysis of glycosidic bonds (chemical). In the reactor, steam under high pressure penetrates the lignocellulosic structures due to a pressure differential, or by convection or diffusion. The steam may also simply heat water already present within the interstitial spaces of the biomass itself, thereby forming hot water and/or steam in the interstitial spaces. In the case of steam, the steam condenses under the high pressure, thereby "wetting" the material (in the case of hot water, the material will already be "wetted"). The water in the biomass hydrolyzes the acid functionalities of the hemicellulose, forming free organic acids, such as acetic acid. Acid byproducts may also form, such as formic acid. The acids, in turn, catalyze the depolymerization of hemicellulose, releasing xylo-oligosaccharides and limited amounts of gluco-oligosaccharides. Under extreme conditions, the amorphous regions of cellulose may be hydrolyzed to some degree. Excessive conditions, i.e., high temperatures and pressures, however, can also promote the degradation of xylose to furfural and glucose to 5-hydroxymethyl furfural. The "wet" biomass is "exploded" when the pressure within the reactor is released. Several phenomena occur at this point. First, the condensed moisture within the structure evaporates instantaneously due to the sudden decrease in pressure. The expansion of the water vapor exerts a shear force on the surrounding structure. If this shear force is high enough, the vapor will cause the mechanical breakdown of the lignocellulosic structures. A suitable system for carrying out steam explosion, or digestion followed by steam explosion, is disclosed in U.S. Pat. No. 8,057,639, hereby incorporated by reference in its entirety.

As used herein, "comminuting" means any mechanical technique for the size reduction of a solid, such as crushing, grinding, collision milling, and the like.

"As used herein, "lignocellulosic biomass" refers to plant biomass containing cellulose, hemicellulose, and lignin from a variety of sources, including, without limitation (1) agricultural waste (including corn stover and sugarcane bagasse), (2) dedicated energy crops, (3) wood waste (including sawmill and paper mill discards derived from, e.g., hardwoods and softwoods), and (4) municipal waste." Annual fiber biomass may be used. Any suitable biomass can be employed to generate the lignin-containing residue, provided the starting biomass comprises lignin.

It must be noted that any individual feature disclosed herein can be combined with any other individual feature or features disclosed herein, provided that the resulting combination of one or more features produces an operable embodiment of the invention.

In some embodiments, a method is provided for producing functionalized lignin, the method comprising: providing a residue comprising lignin and cellulose; subjecting the residue to a liquid comprising an organic compound, thereby forming a first mixture; wherein the subjecting is performed at a first temperature of about 100° C. or less; and wherein the first mixture comprises: a first liquid fraction comprising solubilized functionalized lignin, wherein the solubilized functionalized lignin is functionalized with the organic compound; and a first solid fraction comprising cellulose.

Figure 1:
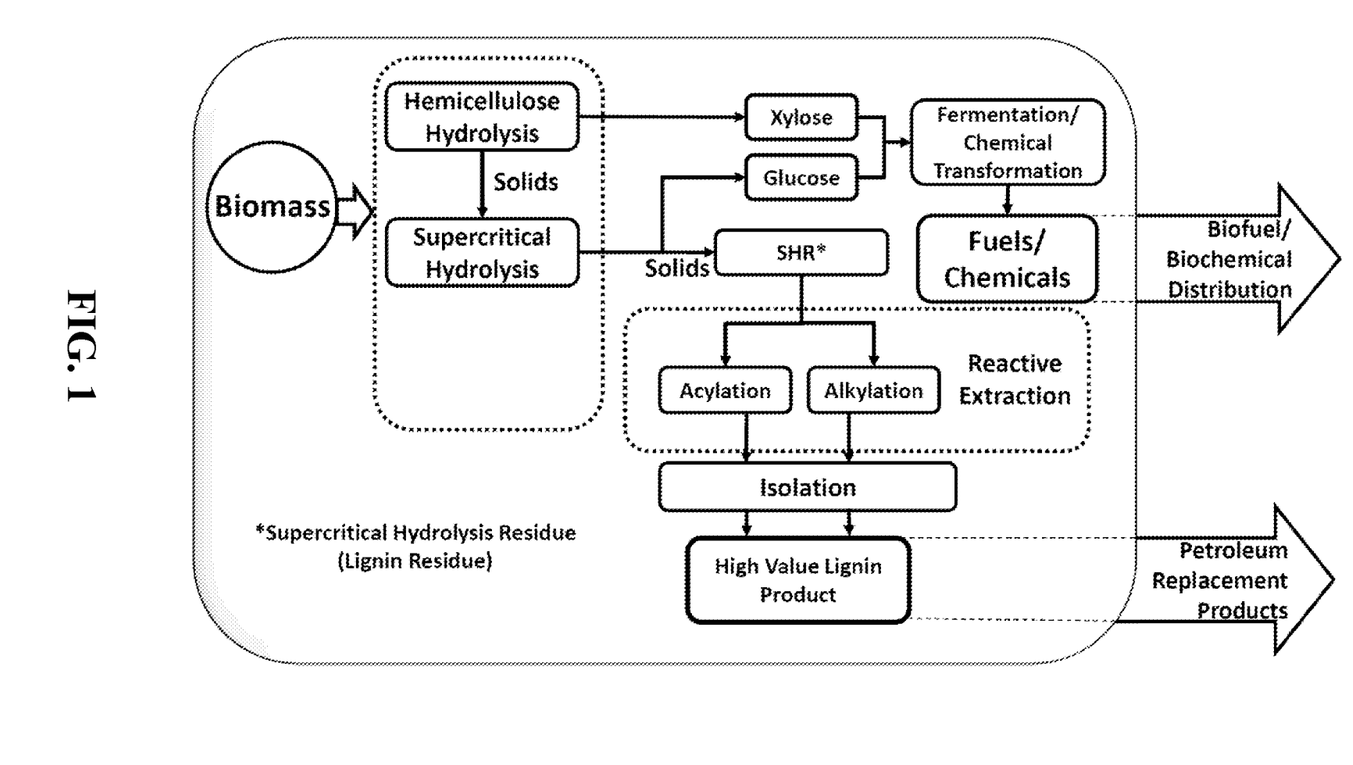
FIG. 1 illustrates a biorefinery model in which a lignin-containing residue can be upgraded via acylation and/or alkylation via an embodiment of the inventive method.
Figure 2:
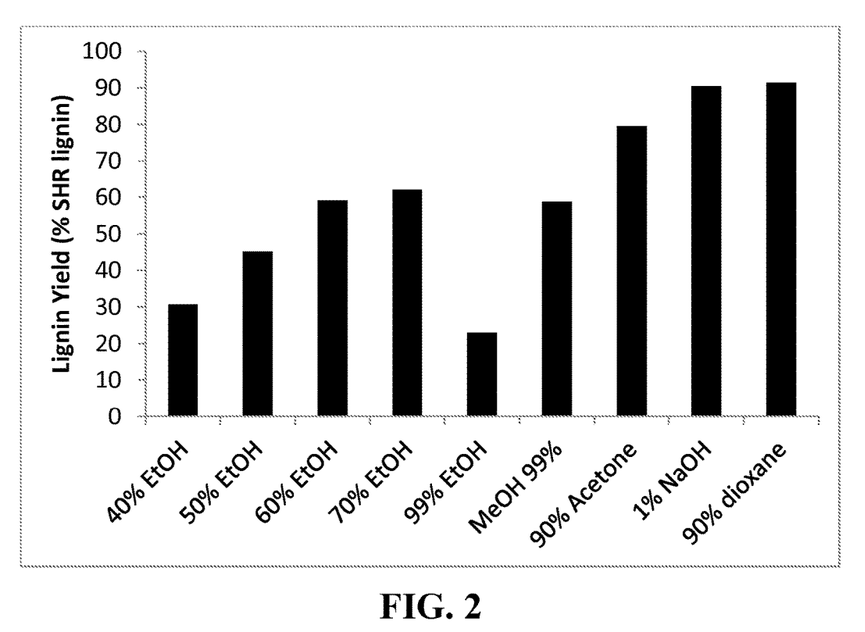
FIG. 2 illustrates the reactive extraction yields obtained when employing different extraction liquids. Percentages are proportion of the indicated species to water (w/w).

Lignin can be upgraded by simultaneously functionalizing and extracting it from biorefinery residues. FIG. 1 depicts an example process (e.g., a two-step process to produce a lignin-containing residue, SHR, as described elsewhere herein). Lignin alkylation or acylation can result in superior properties of the modified lignin in such important applications as, for example, thermoplastic blends and carbon fiber manufacture. The alkoxy or the acyl groups on the modified lignins improve polymer miscibility and compatibility {1}. However, a dedicated lignin alkylation process is rather expensive and complex {2, 3}.

The feedstock employed in the inventive methods can be any suitable lignin-containing residue. For example, lignin-containing residue (so-called "SHR" for supercritical hydrolysis residue) directly derived from the supercritical hydrolysis (SH) reactor in a two-step sub/near/supercritical process can be employed (see, e.g., WO 2011/091044, hereby incorporated by reference in its entirety). Other lignin-containing biorefinery residues may also be employed, including residues from enzymatic hydrolysis, acid hydrolysis, steam explosion, or treatments comprising $SO_2$ and/or $CO_2$. The lignin-containing biorefinery residue can be comminuted, if desired, prior to or during the reactive extraction. In some embodiments, the residue can be produced by a combination of any of the aforementioned processes in any order (e.g., a treatment comprising $SO_2$ and enzymatic hydrolysis). In some embodiments, raw lignocellulosic biomass can first be subjected to enzymatic hydrolysis, followed by hydrothermal treatment (e.g., supercritical hydrolysis) of the resulting mixture, thereby producing the residue. In some embodiments, hydrothermal treatment can first be performed on raw lignocellulosic biomass, and the resulting mixture then subjected to acid hydrolysis, thereby producing the residue. In another embodiment, a raw lignocellulosic biomass can first be subjected to hemicellulose extraction (e.g., digestion), followed by steam explosion (e.g., reducing the particle size), followed by hydrothermal treatment (e.g., supercritical hydrolysis), thereby producing the residue. Combinations of three, four, or more treatments may also be made. Any combination of the aforementioned processes/treatments in any order and in any number is contemplated.

As used herein, "residue" means a lignin-containing material, typically a solid (which may contain some liquid), remaining after a raw lignocellulosic biomass has been subjected to a hydrolysis process, an extraction process (e.g., hemicellulose extraction), and/or a chemical treatment (e.g., SO2 treatment). As used herein, "raw lignocellulosic biomass" or simply "lignocellulosic biomass" means biomass that has not been subjected, or has not been substantially subjected, to a hydrolysis process, an extraction process, and/or chemical treatment. Comminution (e.g., grinding) is not a process that in and of itself produces a residue, because comminution is not one of the processes defined above to produce a residue. "Has not been substantially subjected" means that raw lignocellulosic biomass may have been fleetingly subjected to one of the indicated processes/treatments (intentionally or unintentionally), but the composition (e.g., hemicellulose, cellulose, and lignin content) of the raw lignocellulosic biomass is still substantially similar to the raw lignocellulosic biomass before such fleeting processes/treatments. For example, if a hardwood raw lignocellulosic biomass in the form of woodchips is subjected to a temperature of about 90° C. for about 10 minutes or less (e.g., as a washing step to remove impurities, dirt, debris, etc.), these conditions would not substantially change the composition of the raw lignocellulosic biomass, such that the raw lignocellulosic biomass has not been substantially subjected to a process/treatment, as defined herein.

In some embodiments, subcritical and supercritical hydrolysis via a two-step process (see, e.g., WO 2011/091044, hereby incorporated by reference in its entirety) is used to produce a lignin-containing residue. In this case, the lignin-containing residue, so-called "SHR" for supercritical hydrolysis residue, directly derived from the near-critical or supercritical hydrolysis (SH) reactor contains lignin as well as small amounts of residual sugars, mainly glucan, which residue can be further refined/upgraded to obtain high-purity functionalized lignin of higher value.

In many separation processes, lignin is subjected to harsh chemical treatment techniques in order to remove the lignin from biomass, which harsh treatments can contribute to a more degraded lignin structure and the introduction of unwanted functional groups (e.g., sulfur groups). In contrast, near-critical or supercritical hydrolysis (SH) results in lignin products that are substantially sulfur-free and have less degradation of the lignin structure. These SH-derived lignin products have a unique chemical composition and molecular structure, as well as good reactivity and solubility in solvents. They are produced with different levels of purity and in a wide range of chemical structures. See, for example, U.S. Patent Application Publication 2014/0275501, hereby incorporated by reference in its entirety. The invention as described herein, however, is not limited only to lignin-containing residues derived from SH processes. In fact, lignin-containing residues from other processes, as discussed elsewhere herein, may also be employed in the inventive methods disclosed herein.

To produce SHR (i.e., a residue), a two-step or one-step process can be employed. In the two-step process, biomass is first extracted with a fluid comprising water to remove at least a portion of the hemicellulose. In some embodiments, the residue is obtained by a process comprising: extracting at least a portion of hemicellulose from a lignocellulosic biomass using a first fluid comprising water, thereby forming a second mixture comprising: a second liquid fraction comprising hemicellulose; and a second solid fraction comprising treated lignocellulosic biomass; wherein the first fluid has a second temperature of at least about 110° C. and a second pressure of at least about 10 bar; exposing the treated lignocellulosic biomass to a second fluid comprising water, thereby forming a third mixture comprising: a third liquid fraction; and a third solid fraction comprising the residue; wherein the second fluid has a third temperature of at least about 350° C. and a third pressure of at least about 180 bar.

Suitable temperatures in the first step (i.e., the extracting step) include at least about 110° C., e.g., at least about 120° C., 130° C., 140° C., 150° C., 160° C., 170° C., 180° C., 190° C., or at least about 200° C. (each of the foregoing numbers is preceded by the phrase "at least about"). Alternatively, or in addition, suitable temperatures include less than about 210° C., e.g., less than about 200° C., 190° C., 180° C., 170° C., 160° C., 150° C., 140° C., 130° C., or less than about 120° C. (each of the foregoing numbers is preceded by the phrase "less than about"). Any of the foregoing endpoints can be combined to describe a close-ended range, or the endpoints can singly describe an open-ended range.

Suitable pressures in the first step (i.e., extracting step) include at least about 10 bar, e.g., at least about 20 bar, 30 bar, 40 bar, 50 bar, 60 bar, 70 bar, 80 bar, 90 bar, 100 bar, 120 bar, 140 bar, 160 bar, 180 bar, or at least about 200 bar (each of the foregoing numbers is preceded by the phrase "at least about"). The maximum pressure is not particularly important, but alternatively, or additionally, may be less than about 210 bar, e.g., less than about 200 bar, 180 bar, 160 bar, 140 bar, 120 bar, 100 bar, 90 bar, 80 bar, 70 bar, 60 bar, 50 bar, 40 bar, 30 bar, or less than about 20 bar (each of the foregoing numbers is preceded by the phrase "less than about"). Any of the foregoing endpoints can be combined to describe a close-ended range, or the endpoints can singly describe an open-ended range.

Residence time in the first step (i.e., extracting step) typically will be determined by the temperature employed. Typically, however, the residence time will be on the order of minutes, e.g., at least about 1 min, 2 min, 3 min, 4 min, 5 min, 6 min, 7 min, 8 min, 9 min, 10 min, 20 min, 30 min, 40 min, 50 min, 60 min, 70 min, 80 min, 90 min, 100 min, 110 min, 120 min, 130 min, 140 min, 150 min, 160 min, 170 min, 180 min, 190 min, or at least about 200 min (each of the foregoing numbers is preceded by the phrase "at least about"). Alternatively, or in addition, the residence time can be less than about 210 min, e.g., less than about 200 min, 190 min, 180 min, 170 min, 160 min, 150 min, 140 min, 130 min, 120 min, 110 min, 100 min, 90 min, 80 min, 70 min, 60 min, 50 min, 40 min, 30 min, 20 min, 10 min, 9 min, 8 min, 7 min, 6 min, 5 min, 4 min, 3 min, or less than about 2 min (each of the foregoing numbers is preceded by the phrase "less than about"). Any of the foregoing endpoints can be combined to describe a close-ended range, or the endpoints can singly describe an open-ended range.

Any suitable fluid can be used in the first step (i.e., extracting step). Typically the fluid comprises water. The fluid may also consist essentially of or consist of water. The fluid may be a mixture. For example, the fluid can comprise water, ethanol, propanol (e.g., isopropanol), butanol, carbon dioxide, sulfur dioxide, or any combination thereof, such as water and ethanol mixtures, water and carbon dioxide mixtures, water and sulfur dioxide mixtures, water and ethanol and carbon dioxide mixtures, ethanol and propanol mixtures, ethanol and carbon dioxide mixtures, and the like.

The first step can be digestion to remove hemicellulose sugars, followed by size reduction of the resulting digested biomass. In some embodiments, the size reduction is selected from the grouping consisting of steam explosion, comminution, and a combination thereof. A suitable system for carrying out steam explosion, or digestion followed by steam explosion, is disclosed in U.S. Pat. No. 8,057,639, hereby incorporated by reference in its entirety. The first step can also extract hemicellulose by extracting a size reduced raw lignocellulosic biomass using a fluid comprising sub-critical water. Since the biomass is already size reduced prior to the extracting, the biomass need not be further size reduced in this embodiment prior to the second step. In some embodiments, however, the extracted biomass may be further size reduced prior to the second step.

In the second step (i.e., exposing step) of the two-step process, a near-critical or supercritical fluid (i.e., the second fluid) can be employed to hydrolyze a significant portion of the cellulose remaining in the solids after the first step, thereby forming the third mixture. Here the pretreated solids (i.e., the treated lignocellulosic biomass), normally containing 55-60% cellulose and 36-40% lignin, are slurried with water to achieve the desired solids content and optionally pumped to a preheater. The slurry (or preheated slurry) can then be mixed with near-critical or supercritical water to rapidly bring the slurry to reaction temperature, and fed to the supercritical tubular reactor. The treated lignocellulosic biomass is allowed to react for a time period (residence time) on the order of seconds, thereby forming a third mixture comprising a third liquid fraction and a third solid fraction comprising the residue. Lastly, the third liquid fraction, which can comprise solubilized glucose oligosaccharides and monosaccharides (C6 sugar stream), are separated from the remaining solids (i.e., the third solid fraction), primarily comprising lignin and some cellulose, by filtration or a gravity separation technique such as centrifugation, hydroclone separation, settling, etc. The remaining solids (i.e., the third solid fraction) are rich in lignin content.

The fluid (i.e., second fluid) used in the second step (i.e., the exposing step) can have a temperature of at least about 350° C., e.g., at least about 355° C., 360° C., 365° C., 370° C., 374° C., 380° C., 390° C., 400° C., 410° C., 420° C., 430° C., 440° C., 450° C., 460° C., 470° C., 480° C., 490° C., 500° C., 510° C., 520° C., 530° C., 540° C., or at least about 550° C. (each of the foregoing numbers is preceded by the phrase "at least about"). Alternatively, or in addition, the temperature of the fluid can be 575° C. or less, e.g., about 550° C. or less, about 540° C. or less, about 530° C. or less, about 520° C. or less, about 510° C. or less, about 500° C. or less, about 490° C. or less, about 480° C. or less, about 470° C. or less, about 460° C. or less, about 450° C. or less, about 440° C. or less, about 430° C. or less, about 420° C. or less, about 410° C. or less, about 400° C. or less, about 390° C. or less, about 380° C. or less, about 375° C. or less, about 370° C. or less, about 365° C. or less, or about 360° C. or less. Any of the foregoing endpoints can be combined to describe a close-ended range, or the endpoints can be singly employed to describe an open-ended range.

The fluid (i.e., second fluid) used in the second step (i.e., the exposing step) can have a pressure of at least about 180 bar, e.g., at least about 185 bar, 190 bar, 195 bar, 200 bar, 205 bar, 210 bar, 215 bar, 220 bar, 221 bar, 225 bar, 230 bar, 250 bar, 275 bar, 300 bar, 325 bar, 350 bar, 375 bar, 400 bar, 425 bar, 450 bar, 475 bar, 500 bar, 525 bar, 550 bar, 575 bar, 600 bar, 625 bar, 650 bar, 675 bar, 700 bar, 725 bar, 750 bar, 775 bar, or at least about 800 bar (each of the foregoing numbers is preceded by the phrase "at least about"). The maximum pressure is not particularly limited, but can be less than about 800 bar, e.g., less than about 775 bar, 750 bar, 725 bar, 700 bar, 675 bar, 650 bar, 625 bar, 600 bar, 575 bar, 550 bar, 525 bar, 500 bar, 475 bar, 450 bar, 425 bar, 400 bar, 375 bar, 350 bar, 325 bar, 300 bar, 275 bar, 250 bar, 225 bar, 220 bar, 215 bar, 210 bar, 205 bar, 200 bar, 195 bar, or less than about 190 bar (each of the foregoing numbers is preceded by the phrase "less than about"). Any of the foregoing endpoints can be combined to describe a close-ended range, or the endpoints can be singly employed to describe an open-ended range.

After contacting the slurry with the fluid, the slurry and fluid mixture can be held for any suitable duration (i.e., residence time) to effect the desired degree of hydrolysis and form the third mixture. For example, the duration can be about 0.05 seconds or more, e.g., about 0.1 seconds or more, about 0.2 seconds or more, about 0.3 seconds or more, about 0.4 seconds or more, about 0.5 seconds or more, about 0.6 seconds or more, about 0.7 seconds or more, about 0.8 seconds or more, about 0.9 seconds or more, about 1 seconds or more, about 1.1 seconds or more, about 1.2 seconds or more, about 1.3 seconds or more, about 1.4 seconds or more, about 1.5 seconds or more, about 2 seconds or more, about 2.5 seconds or more, about 3 seconds or more, about 3.5 seconds or more, about 4 seconds or more, about 4.5 seconds or more, about 5 seconds or more, about 6 seconds or more, about 7 seconds or more, about 8 seconds or more, or about 9 seconds or more. Alternatively, or in addition, the duration can be about 10 seconds or less, e.g., about 9 seconds or less, about 8 seconds or less, about 7 seconds or less, about 6 seconds or less, about 5 seconds or less, about 4.5 seconds or less, about 4 seconds or less, about 3.5 seconds or less, about 3 seconds or less, about 2.5 seconds or less, about 2 seconds or less, about 1.5 seconds or less, about 1.4 seconds or less, about 1.3 seconds or less, about 1.2 seconds or less, about 1.1 seconds or less, about 1 seconds or less, about 0.9 seconds or less, about 0.8 seconds or less, about 0.7 seconds or less, about 0.6 seconds or less, about 0.5 seconds or less, about 0.4 seconds or less, about 0.3 seconds or less, about 0.2 seconds or less, or about 0.1 seconds or less. Any of the foregoing endpoints can be combined to describe a close-ended range, or the endpoints can be singly employed to describe an open-ended range.

Any suitable fluid (i.e., second fluid) can be used in the second step. Typically the fluid comprises water. The fluid may also consist essentially of or consist of water. The fluid may be a mixture. For example, the fluid can comprise water, ethanol, propanol, butanol, carbon dioxide, sulfur dioxide, or any combination thereof, such as water and ethanol mixtures, water and carbon dioxide mixtures, water and sulfur dioxide mixtures, water and ethanol and carbon dioxide mixtures, ethanol and propanol mixtures, ethanol and carbon dioxide mixtures, and the like. In some embodiments, the second fluid comprises, consists of, or consists essentially of supercritical water.

After holding the slurry under reaction conditions for a suitable residence time, the hot slurry (i.e., third mixture) can be cooled using, e.g., flash cooling, heat exchange, contacting with a cool fluid, and the like, or any combination thereof. The cooling can occur in one stage, or the cooling can occur using multiple stages, e.g., multiple flash cooling stages, multiple heat exchange stages, or any combination thereof.

Instead of a two-step method for processing biomass to produce lignin-rich solids (i.e., the residue), a one-step method can be employed. In this method, the first step (e.g., auto-hydrolysis or hemicellulose extraction) is excluded, and instead the second step (supercritical fluid hydrolysis) as disclosed hereinabove is carried out on the raw biomass. The raw biomass typically can be comminuted to a smaller size suitable for use in the supercritical process. Although the first step as described herein is not employed in this one step process, the raw biomass may first be treated in other ways prior to supercritical hydrolysis in order to facilitate the processing of the biomass (e.g., to facilitate the extraction of C5 sugars, C6 sugars, COS, and/or lignin). For example, the raw biomass may be dried, subjected to an acid treatment, subjected to fungal or biocatalytic treatment, or any combination thereof. Typically, however, only comminution is performed on the biomass to reduce its size prior to supercritical hydrolysis. Comminution can be performed with conventional mechanical means, or size reduction can be performed using explosion technology (e.g., steam explosion). The effluent stream from this single step process likely will have a different composition than the effluent stream from either the first step or the second step of the two step process, since the hemicellulosic sugars may still be present in this one-step method upon supercritical hydrolysis. The solids, however, will still be lignin-rich.

In some embodiments, the residue is obtained by a process comprising: exposing a lignocellulosic biomass to a second fluid comprising water, thereby forming a fourth mixture comprising: a fourth liquid fraction; and a fourth solid fraction comprising the residue; wherein the second fluid has a third temperature of at least about 350° C. and a third pressure of at least about 180 bar.

The fluids, temperatures, pressures, and residence times disclosed herein for the second step (i.e., exposing step) of the two-step process are equally applicable to the fluids, temperatures, pressures, and residences times for the fluid employed in this one-step process.

In some embodiments, a method is provided for producing functionalized lignin, the method comprising: providing a residue comprising lignin and cellulose; subjecting the residue to a liquid comprising an organic compound, thereby forming a first mixture; wherein the subjecting is performed at a first temperature of about 100° C. or less; and wherein the first mixture comprises: a first liquid fraction comprising solubilized functionalized lignin, wherein the solubilized functionalized lignin is functionalized with the organic compound; and a first solid fraction comprising cellulose.

In some embodiments, the residue comprises lignin and cellulose. In some embodiments, the residue may further comprise at least one of hemicellulose, ash, extractives, and other components. In some embodiments, the residue comprises less than about 20 wt. % (less than about 15 wt. %, less than about 10 wt. %, or less than about 5 wt. %) hemicellulose, based on the dry weight of the residue.

In some embodiments, the residue is subjected to a liquid comprising an organic compound, thereby forming a first mixture. In some embodiments, the liquid consists of or consists essentially of the organic compound. The organic compound can be any suitable organic compound that functionalizes lignin under a first temperature of about 100° C. or less. Suitable organic compounds include, for example, alcohol and/or organic acid. Other suitable organic compounds are disclosed hereinbelow. In some embodiments, the liquid further comprises an acid. In some embodiments, the liquid further comprises water. In general, the liquid comprising the organic compound operates to both solubilize and functionalize the lignin, thereby "reactively extracting" the lignin from the residue. In this respect, the liquid should have properties sufficient to solubilize the lignin (at least a portion thereof, e.g., at least about 20%, at least 30%, at least 40%, at least 50%, at least 60%, at least 70%, at least 80%, at least 90%, or at least 99% by weight, based on the original weight of the lignin in the residue, each of the foregoing numbers is preceded by the word "about"), while also containing an organic compound that can functionalize the lignin. In other words, the organic compound does not necessarily have to solubilize the lignin, but the liquid as a whole should have properties sufficient to solubilize at least a portion of the lignin (as noted hereinabove). In some embodiments, an organic compound may be present that cannot solubilize lignin (e.g., a fatty acid), but this organic compound can be present in a liquid that can solubilize at least a portion of the lignin, and this organic compound (e.g., fatty acid) can still functionalize the lignin.

In some embodiments, we have found that extraction of lignin from SHR solids with an aqueous alcohol (i.e., a liquid comprising an alcohol and water, in which the alcohol is the organic compound) (such as methanol, ethanol (one or more —OHs in any position, such as 1,2-ethanediol), propanol (one or more —OHs in any position, such as isopropanol or 1-propanol), t-butanol (one or more —OHs in any position), and any combination thereof) under mild conditions with or without addition of catalytic amounts of strong acid (e.g., mineral acids such as sulfuric acid, phosphoric acid, hydrochloric acid, hydrobromic acid, sulfurous acid, and organic acids such as p-toluenesulfonic acid, acetic acid, formic acid, propionic acid, oxalic acid, benzoic acid, carbonic acid, butyric acid, valeric acid, caproic acid, lactic acid, malic acid, trifluoroacetic acid, trifluoromethanesulfonic acid, citric acid, and any combination thereof) results in partial alkylation of lignin during the extraction process. In some embodiments, added amounts of strong acid can exceed a catalytic amount, whereas in other embodiments, a strong acid need not be employed at all. Typically, water-miscible alcohols can be employed, but water-immiscible alcohols (or partially immiscible alcohols) may additionally or alternatively be used (i.e., mixtures may be employed). Examples of water-immiscible or partially-immiscible alcohols include n-butanol, sec-butanol, pentanol (one or more —OHs in any position), hexanol (one or more —OHs in any position), heptanol (one or more —OHs in any position), octanol (one or more —OHs in any position), nonanol (one or more —OHs in any position), decanol (one or more —OHs in any position), and any combination thereof. Various lignin extraction yields can be achieved with different aqueous solvent mixtures (see FIG. 2—30 min extraction at room temperature). Specifically, aqueous ethanol can extract about 60% of lignin at an ethanol concentration of 60-70% in water (w/w). Moreover, the lignin can be fractionated using step-wise extraction with solvents containing various proportions of ethanol in water (or 100% ethanol containing no, or only residual, water), so as to obtain fractions of lignin with different properties. In some embodiments, the alcohol is selected from the group consisting of methanol, propanol, isopropanol, butanol, pentanol, hexanol, octanol, nonanol, decanol, a polyhydric version of any aforementioned alcohol, and any combination thereof. In some embodiments, the alcohol is ethanol.

Lignin can be acylated using a process similar to the alkylation process, although a different organic compound is used, e.g., organic acids (such as acetic, formic, ethanoic, propionic, butyric, pentanoic, and any combination thereof, as well as any other suitable acid), with or without the addition of strong acid {4}. In some embodiments, the organic compound is acetic acid.

In some embodiments, the subjecting step is performed with ethanol and sulfuric acid. In some embodiments, the subjecting step is performed with ethanol, water, and sulfuric acid. In some embodiments, the proportion of ethanol in water can be about 40% to about 70% (w/w). In some embodiments, the subjecting step is performed with acetic acid (and only residual water). In some embodiments, the subjecting step is performed with acetic acid and water, without additional acid. In some embodiments, the subjecting step is performed with acetic acid, water, and acid (e.g., sulfuric acid). In some embodiments, the subjecting step is performed with ethanol, water, and no additional acid. In some embodiments, the subjecting step further comprises diluting a combination of the liquid and the residue with, thereby forming the first mixture (in other words, the subjecting step effectively comprises two step: subjecting the residue to a liquid comprising an organic compound followed by diluting the liquid with water, thereby forming the first mixture). See, e.g., FIG. 5. When the subjecting step comprises two steps, the first step can be performed with a high concentration (about 85% or more, about 90% or more, about 95% or more, or about 100% (w/w)) of alcohol and/or organic acid, followed by diluting the resulting mixture with water to a concentration of alcohol and/or organic acid of about 60-80% (w/w), which solubilizes the lignin present (forming the first mixture). The resulting first mixture can be separated to separate the residual cellulose (first solid fraction) from the solubilized functionalized lignin (first liquid fraction). Additional water can then be added to the first liquid fraction to precipitate the lignin for subsequent filtration/isolation. In some embodiments (e.g., when the subjecting step comprises two steps), lignin is partially soluble in about 80-100% alcohol in water (e.g., ethanol), the lignin solubility increases as water is added to a proportion of about 60-80% alcohol in water (useful for filtering solubilized functionalized lignin away from residual cellulose solids), and then the lignin solubility decreases as even more water is added to further decrease the proportion of alcohol and/or organic acid.

Figure 5:
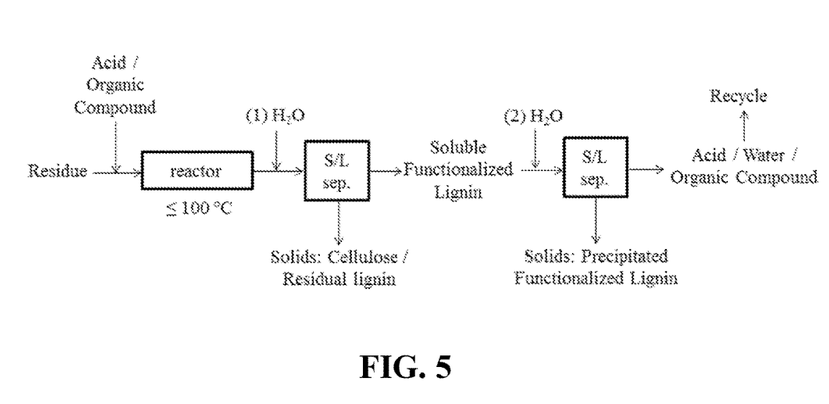
FIG. 5 illustrates a schematic representation of an embodiment of the invention.

An embodiment of the invention is depicted in FIG. 5. It must be noted that any individual feature of the embodiment of FIG. 5 can be combined with any other feature described herein, or with any other individual feature of another embodiment described herein. As shown in FIG. 5, a lignin-containing residue is subjected to a liquid comprising acid and an organic compound (at a concentration of 80-100% by weight organic compound in the liquid, the balance may be water if the organic compound is not present in an amount of 100%) at a temperature of 100° C. or less, followed by dilution of this resulting mixture to a concentration of about 60-80% by organic compound in water. The organic compound can be any suitable organic compound as disclosed herein (e.g., ethanol, acetic acid, or a combination thereof, for example). Without wishing to be bound by theory, it is hypothesized, though not necessarily confirmed, that the 80-100% concentration maximizes functionalization, whereas the 60-80% concentration maximizes solubility of functionalized lignin. Solid/liquid separation is then performed to separate cellulose and residual lignin solids from the solubilized functionalized lignin. A second water addition decreases the organic compound concentration to below 60%, thereby precipitating the functionalized lignin from the solution. A subsequent solid/liquid separation is performed to separate the precipitated lignin from the liquid comprising acid, water, and organic compound. The liquid can then be recycled back to the subjecting step with a fresh batch of lignin-containing residue. In some embodiments, the first water addition step ("(1) H$_2$O") is not performed, but the remaining steps, including the first solid/liquid separation step, may still be performed. In such embodiments, the first solid/liquid separation may have a solids fraction with more lignin present than if the first water addition is performed, but these lignin-enriched solids may be collected as is, or may be sent through the reactor one or more additional times.

The alkylation or acylation as described herein allows for partial modification of lignin during the same extraction process, thus combining lignin extraction and alkylation and/or acylation (i.e., "reactive extraction"). The yield of extracted lignin is higher than in a control experiment (without acid addition) that has been carried out. Other characteristics of lignin such as molecular weight, glass transition temperature (Tg), and molecular structure can be also manipulated by the process variables. The combination of lignin modification (functionalization) and extraction is a very simple process that uses cheap chemicals allowing for a significantly cheaper process as compared to other known processes for producing functionalized lignins with enhanced properties.

In one embodiment, SHR can be mixed with a fluid consisting of a solvent and optionally water at a desired ratio, as described elsewhere herein. A suitable amount of mineral acid (catalyst) can be added, and the slurry charged into a reactor (e.g., batch, semi-batch, or continuous). The reactor can be operated under atmospheric pressure (or a higher pressure if desired) and the solvent vapor, if present, can be condensed using a condenser, thereby returning the condensed solvent to the reactor. The reaction slurry can be heated to a suitable temperature and retained in the reactor for a suitable period of time under continuous or intermittent mixing (e.g., agitation, shearing, shaking, any combination thereof, etc).

After the lignin modification is completed, the solvent to water ratio can be adjusted to a concentration optimal for lignin extraction (i.e., to adjust the lignin solubility) by dilution with water, or another suitable solvent. Alternatively, after the modification, the reaction solution can be drained from the reactor, and the lignin further extracted and washed with an optimal solvent mixture. These two streams can be processed separately in order to obtain two products with different characteristics (MW, Tg, molecular structure, degree of derivatization) based on economic feasibility and desired lignin characteristics.

After the reactive extraction, the solution of the modified lignin can be separated from the insoluble residue consisting of mainly unconverted cellulose using conventional techniques. The residue will be washed with a minimal amount of solvent (of the optimal concentration) to maximize the yield of the lignin product, and then with water to recover solvent retained in the residue. The washing streams can be recycled in the process to ensure the most efficient and economical use of the solvent and water.

The lignin solution can be diluted with water to precipitate the extracted lignin from the solution. The precipitated lignin can be separated by filtration, washed with water, and dried to produce alkylated or acylated lignin. The solvent/water mixture separated from the precipitated lignin can be distilled to recover the solvent for use in the process.

ondary aliphatic OH or OR and carboxylic OH or OR reactive centers participate in derivatization. In Equations 1-6, the $R^3$ group can represent either H or an alkyl group. Equation 1 depicts alkylation at lignin hydroxyl or OR positions to produce ether derivatives. Equation 2 depicts alkylation at lignin carboxyl positions to produce ester derivatives. Equation 3 depicts acylation at lignin OH or OR positions with ester formation. Equation 4 depicts alkylation at a benzylic position on lignin. Equation 5 depicts alkylation at a position conjugated to an aromatic ring on lignin. Equation 6 depicts alkylation of a ketone on lignin via hemiketal and ketal formation. The use of longer carbon chain alcohols or acids (e.g., fatty acids), which would produce modified lignin with corresponding longer chain alkyl or acyl groups, may also be employed.

The alkylation and/or acylation (i.e., the subjecting step) can be performed at any suitable temperature. Typically, a suitable temperature is about 100° C. or less, but may be up to 120° C. or 130° C. if desired. Suitable temperatures for alkylation and/or acylation also include about 15° C. or more, e.g., 20° C. or more, 25° C. or more, 30° C. or more, 35° C. or more, 40° C. or more, 45° C. or more, 50° C. or more, 55° C. or more, 60° C. or more, 65° C. or more, 70° C. or more, 75° C. or more, 80° C. or more, 85° C. or more, 90° C. or more, or 95° C. or more. Alternatively, or in addition, suitable temperatures can be 100° C. or less, e.g., 95° C. or less, 90° C. or less, 85° C. or less, 80° C. or less, 75° C. or less, 70° C. or less, 65° C. or less, 60° C. or less, 55° C. or less, 50° C. or less, 45° C. or less, 40° C. or less, 35° C. or less, 30° C. or less, or 25° C. or less. The aforementioned temperatures ranges can be open-ended ranges, or can be combined into close-ended ranges. Any of the aforementioned numbers may be preceded by the word "about."

Equations 1-6 describe general reactions occurring during lignin alkylation and acylation, in which primary and secondary The alkylation and/or acylation (i.e., the subjecting step) can be performed at any suitable pressure. The pressure is not particularly important, but from an economic standpoint, it is desirable to perform the subjecting at lower pressures. For example, suitable pressures can be less than about 73 bar, e.g., less than about 70 bar, less than about 60 bar, less than about 50 bar, less than about 40 bar, less than about 30 bar, less than about 20 bar, less than about 10 bar, less than about 5 bar, or less than about 2 bar. The minimum pressure is not particularly limited, but may be at least atmospheric pressure. In some embodiments, the pressure is atmospheric pressure. In some embodiments, the subjecting is not performed under supercritical conditions for one or more components making up the liquid comprising the organic compound (for example, the subjecting is not performed under conditions sufficient supercritical ethanol to be present). In some embodiments, the subjecting is performed under reflux conditions.

Typically, the alkylation and acylation conditions are carried out using an amount of acid (e.g., strong acid or mineral acid) at a suitable level to enable the alkylation or acylation reactions to proceed. The acid can be employed in a catalytic amount, or the acid can be employed in an amount greater than a catalytic amount. In some embodiments, no additional acid is employed. Suitable pHs for conducting alkylation and acylation include low pHs of less than 4, as measured by a pH meter. Suitable pHs include greater than 0, e.g., greater than 0.5, greater than 1, greater than 1.5, greater than 2, greater than 2.5, greater than 3, or greater than 3.5. Alternatively, or in addition, the pH can be less than 4, e.g., less than 3.5, less than 3, less than 2.5, less than 2, less than 1.5, less than 1, less than 0.5, or less than 0. The aforementioned pH ranges can be open-ended ranges, or can be combined into close-ended ranges. Any of the aforementioned numbers may be preceded by the word "about."

Suitable reaction times for acylation and/or alkylation include at least about 10 min, e.g., at least about 20 min, at least 30 min, at least 45 min, at least 60 min, at least 75 min, at least 90 min, at least 105 min, at least 120 min, at least 135 min, at least 150 min, at least 165 min, at least 180 min, at least 195 min, or at least 210 min. Alternatively, or in addition, suitable reaction times include less than about 225 min, e.g., less than about 210 min, less than 195 min, less than 180 min, less than 165 min, less than 150 min, less than 135 min, less than 120 min, less than 105 min, less than 90 min, less than 75 min, less than 60 min, less than 45 min, less than 30 min, or less than 20 min. The aforementioned ranges can be open-ended ranges, or can be combined into close-ended ranges. Any of the aforementioned numbers may be preceded by the word "about."

Alkylation and acylation can be carried out at any suitable proportion of alcohol or organic acid in water. Proportions include 100% alcohol and/or organic acid, e.g., less than about 99% alcohol or organic acid, less than 97%, less than 95%, less than 93%, less than 90%, less than 85%, less than 80%, less than 75%, less than 70%, less than 65%, less than 60%, less than 55%, less than 50%, less than 45%, less than 40%, less than 35%, or less than 30%. Alternatively, or in addition, proportions include at least about 30% alcohol or organic acid, e.g., at least about 35%, at least 40%, at least 45%, at least 50%, at least 55%, at least 60%, at least 65%, at least 70%, at least 75%, at least 80%, at least 85%, at least 90%, at least 93%, at least 95%, at least 97%, or at least 99%. The aforementioned ranges can be open-ended ranges, or can be combined into close-ended ranges. Any of the aforementioned numbers may be preceded by the word "about." The percentages are on a w/w basis. The proportions can refer to alcohol, organic acid, or a combination of alcohol and organic acid.

The subjecting step produces a first mixture. The first mixture comprises, consists of, or consists essentially of a first liquid fraction comprising solubilized functionalized lignin, wherein the solubilized functionalized lignin is functionalized with the organic compound, and the first mixture also comprises a first solid fraction comprising cellulose. Other components may be present in the first mixture, including hemicellulose, ash, extractives, etc. The first liquid fraction may additionally contain soluble sugars (C5 and/or C6, including glucose, xylose, and oligomers thereof), soluble lignin, and any combination thereof. The first solid fraction may additionally contain lignin, hemicellulose, ash, extractives, and any combination thereof. In some embodiments, separation of the first liquid fraction from the first solid fraction forms a separated first liquid fraction, wherein the separated first liquid fraction contains less than about 5 wt. % cellulose on a dry solids basis (e.g., less than about 4 wt. %, less than about 3 wt. %, less than about 2 wt. %, less than about 1 wt. %, or less than about 0.5 wt. %).

In some embodiments, the solubilized functionalized lignin present in the first liquid fraction is recovered by precipitation by the addition of water to the first liquid fraction, by evaporation of solvent in the first liquid fraction, or a combination thereof.

Alkylation and acylation (i.e., the subjecting step) typically are carried out separately. However, alkylation and acylation can be carried out simultaneously in some embodiments. When carried out simultaneously, both organic solvent and organic acid are combined with the lignin-containing residue to effect simultaneous alkylation, acylation, and extraction. In some embodiments, alkylation and acylation are carried out sequentially or consecutively, in any order. In some embodiments, the organic compound comprises an alcohol and an organic acid, thereby producing functionalized lignin containing both alkoxy and acyl groups.

Any suitable apparatus can be used to carry out the methods of the invention, including, but not limited to, batch reactors, semi-batch reactors, continuous reactors, and the like, and any combination thereof. Typically, any known apparatuses in the art may be used to carry out the inventive methods.

Figure 3:
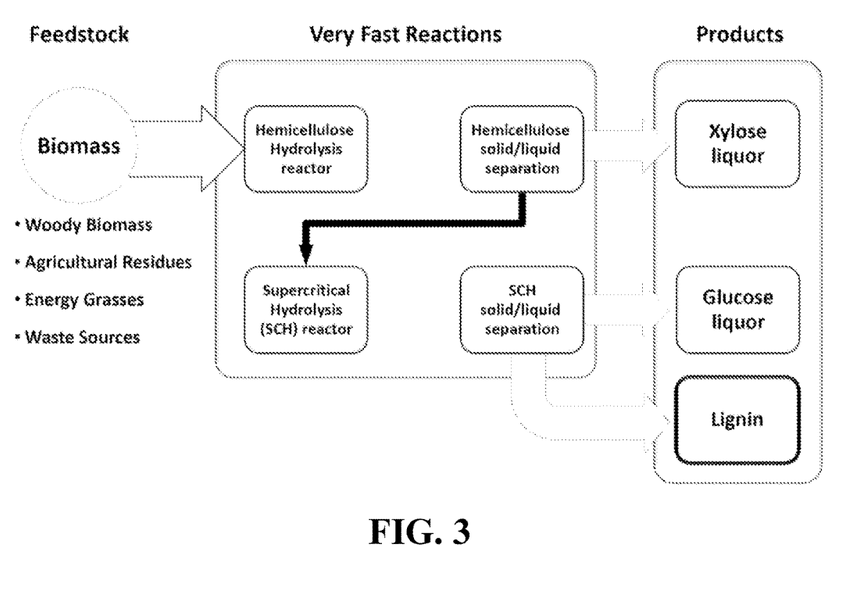
FIG. 3 illustrates a schematic representation of a two-step biomass hydrolysis process used to obtain a lignin-containing residue.
Figure 4:
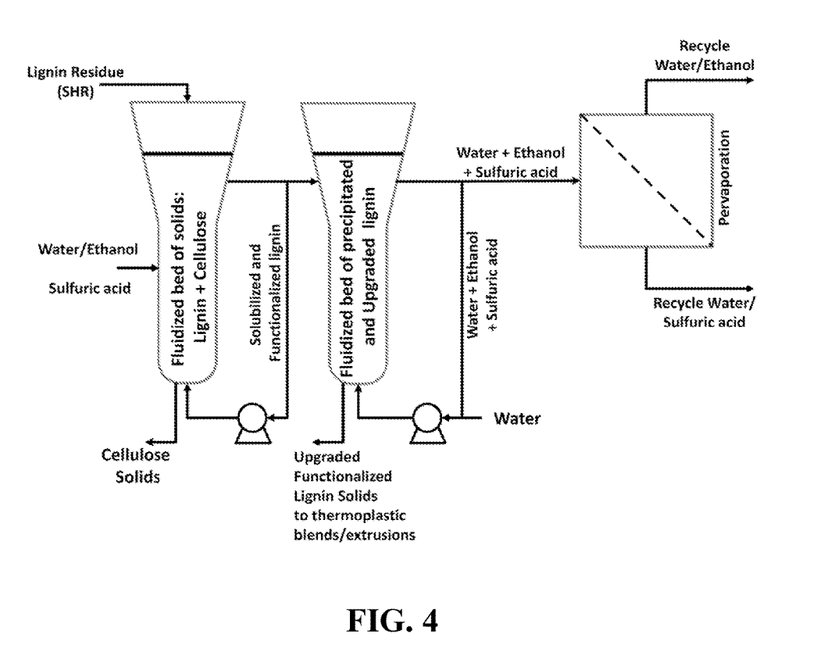
FIG. 4 illustrates a schematic representation of an embodiment of the invention.

Lignin products with different molecular structures and physical properties can be produced for incorporation into thermoplastic blends, e.g., polyolefins as a specific example{5, 11}. A schematic representation of a possible upgrading process, as well as the two-step process described herein, are shown in FIGS. 3 and 4. The two-step process is shown in FIG. 3, and the two-step process is described elsewhere herein.

In one embodiment, referring to FIG. 4, the alkylation upgrading can include the addition of the alcohol and catalytic amounts of mineral acid to the lignin generated in the supercritical hydrolysis process; this functionalizes and extracts the lignin. Specifically, the lignin-containing solid slurry or powder can be continuously or intermittently fed to the top of the reactive extraction unit. A circulation loop fluidizes the lignin solids and entrains them to a separation zone at the top, which optionally could be separate from the extraction unit. The solids which are mainly unconverted cellulose are withdrawn from the bottom of the first stage. In a second stage, the solubilized lignin is precipitated by addition of water. Both stages use a liquid/solid fluidized bed with a recirculation loop. The alcohol/water/catalyst can be concentrated using, for example, pervaporation, steam stripping, vacuum concentration, or other suitable techniques. Subsequent extrusion steps can be carried out to produce thermoplastics, if desired.

Reaction conditions can be varied to tune the degree of alkylation/acylation as well as lignin chemical structure and physical characteristics. Variables such as reaction time and temperature, acid level/pH, and feedstock type (hardwood, softwood, or other lignin-containing biomass feedstocks) can be varied. Alkylation and/or acylation can be achieved in an amount of greater than about 1% of total amount of aliphatic and carboxylic OH and OR groups (e.g., greater than 3%, greater than 5%, greater than 7%, greater than 10%, greater than 12%, greater than 15%, greater than 20%, greater than 25%, greater than 30%, greater than 35%, greater than 40%, greater than 45%, greater than 50%, greater than 55%, or greater than 60. Alternatively, or in addition, less than 65%, less than 60%, less than 55%, less than 50%, less than 45%, less than 40%, less than 35%, less than 30%, less than 25%, less than 20%, less than 15%, less than 12%, less than 10%, less than 7%, less than 5%, or less than 3%). The aforementioned ranges can be open-ended, or can be combined into close-ended ranges. Any of the aforementioned numbers may be preceded with the word "about." The aforementioned values can refer to types of functionality separately (e.g., EtO or Ac), or can refer to a total amount of functionalization (e.g., the sum of EtO and Ac), as will be clear by the context. In some embodiments, the inventive methods disclosed herein functionalize about 1% to about 60% of the total amount of aliphatic and carboxylic OH and OR groups present on the lignin.

Techniques utilized to characterize the lignins are the same as disclosed in U.S. Patent Application Publication 2014/0275501. For example, the amounts of moieties are expressed as units of moiety per 100 aromatic units ("units per 100 Ar"), and can be considered as mol %. The aromatic region (about 100-162 ppm) in the $^{13}C$ spectrum is integrated, and this integral set to a value of 600. Subsequent integration of the moieties or regions of interest in this same spectrum will now be in the units of "per 100 Ar." The unit of measurement "units per 100 Ar" is well known in the art and is the conventional way for describing moieties of lignin. The measurements can be conducted by quantitative nuclear magnetic resonance spectroscopy (NMR), such as quantitative $^{13}C$ NMR spectropscopy. See, for example, Capanema and Jameel et al. (2005) and Capanema and Kadla et al. (2005) for further information on calculating the amounts of moieties in lignin. Quantifying the amounts of the various moieties present in lignin via $^{13}C$ and/or $^{1}H$ NMR spectroscopy typically requires integration of the $^{13}C$ and/or $^{1}H$ NMR spectra. Chemical shift ranges where various lignin moieties or other regions of interest may be located in a $^{13}C$ and/or $^{1}H$ spectrum are reported herein to aid in determining the measurement of these various moieties. However, as one of ordinary skill in the art would certainly understand, the actual integral may be located within a slightly different chemical shift range, and one of ordinary skill in the art would be able to recognize this fact and be able to integrate the appropriate peaks in the appropriate chemical shift range to determine as accurately as possible the integrals of various moieties or regions of interest.

Features of the functionalized lignin can include alkoxy content (e.g., AlkO content, such as EtO content), acyl content (e.g., AcO content, such as acetyl, formyl, propionyl, etc., content), a β-O-4 content per 100 Ar, PhOH content per 100 Ar, a degree of condensation (DC) in %, number average molecular weight (Mn), weight average molecular weight (Mw), and/or polydispersity index (PDI). These features can be combined in any manner to describe the functionalized lignin. Techniques to measure these features are well known in the art. See, for example, U.S. Patent Application Publication 2014/0275501. Native lignin already contains methoxyl content, and thus methoxyl is excluded from alkoxyl, as used herein.

The level of functionalization of the functionalized lignin, expressed as moiety (e.g., AlkO such as EtO, or AcO) per 100 Ar (as defined elsewhere herein and in U.S. Patent Application Publication 2014/0275501), can be any suitable amount. For example, the amount of functionalization (e.g., EtO or Ac) per 100 Ar can be about 1 or more, e.g., about 2 or more, e.g. about 4 or more, about 6 or more, about 8 or more, about 10 or more, about 12 or more, about 14 or more, about 16 or more, about 18 or more, about 20 or more, about 22 or more, about 24 or more, about 25 or more, about 30 or more, about 35 or more, or about 40 or more. Alternatively, or in addition, the amount of functionalization per 100 Ar can be about 45 or less, e.g., about 40 or less, about 35 or less, about 30 or less, about 25 or less, about 24 or less, about 22 or less, about 20 or less, about 18 or less, about 16 or less, about 14 or less, about 12 or less, about 10 or less, about 8 or less, about 6 or less, about 4 or less, or about 2 or less. The aforementioned ranges can be open-ended, or can be combined into close-ended ranges.

The β-O-4 content per 100 Ar can be at least about 8, e.g., at least about 10, 12, 14, 16, 18, 20, 22, 24, 26, 28, or 30 per 100 Ar (each of the foregoing numbers is preceded by the phrase "at least about"). The maximum amount is not particularly limited, but can be less than about 32, e.g., less than about 30, 28, 26, 24, 22, 20, 18, 16, 14, 12, or 10 per 100 Ar (each of the foregoing numbers is preceded by the phrase "less than about"). Any two of the foregoing numbers can be combined to form close-ended range, or can be used individually to define an open-ended range.

The PhOH content per 100 Ar can be at least about 50, e.g., at least about 52, 54, 56, 58, 60, 62, 64, 66, 68, 70, 72, 74, 76, 78, or 80 per 100 Ar (each of the foregoing numbers is preceded by the phrase "at least about"). The maximum amount is not particularly limited, but can be less than about 82, e.g., less than about 80, 78, 76, 74, 72, 70, 68, 66, 64, 62, 60, 58, 56, 54, or 52 per 100 Ar (each of the foregoing numbers is preceded by the phrase "less than about"). Any two of the foregoing numbers can be combined to form close-ended range, or can be used individually to define an open-ended range.

The degree of condensation ("DC" in %) can be at least about 25, e.g., at least about 28, 30, 32, 34, 36, 38, 40, 42, 44, 46, 48, 50, 52, 54, 56, 58, or 60 (each of the foregoing numbers is preceded by the phrase "at least about"). The maximum amount is not particularly limited, but can be less than about 62, e.g., less than about 60, 58, 56, 54, 52, 50, 48, 46, 44, 42, 40, 38, 36, 34, 32, 30, 28, or 25 (each of the foregoing numbers is preceded by the phrase "less than about"). Any two of the foregoing numbers can be combined to form close-ended range, or can be used individually to define an open-ended range.

The number average molecular weight (Mn) in Daltons (as used herein equivalent to g/mol) can be at least about 500, e.g., at least about 550, 600, 650, 700, 750, 800, 850, 900, 950, 1000, 1050, 1100, 1150, 1200, 1250, 1300, 1350, 1400, 1450, 1500, 1600, 1700, 1800, 1900, or 2000 (each of the foregoing numbers is preceded by the phrase "at least about"). The maximum amount is not particularly limited, but can be less than about 2200, e.g., less than about 2000, 1900, 1800, 1700, 1600, 1500, 1350, 1300, 1250, 1200, 1150, 1100, 1050, 1000, 950, 900, 850, 800, 750, 700, 650, 600, 550, or 500 (each of the foregoing numbers is preceded by the phrase "less than about"). Any two of the foregoing numbers can be combined to form close-ended range, or can be used individually to define an open-ended range.

The weight average molecular weight (Mw) in Daltons (as used herein equivalent to g/mol) can be at least about 1300, e.g., at least about 1400, 1500, 1600, 1700, 1800, 1900, 2000, 2100, 2200, 2400, 2600, 2800, 3000, 3200, 3400, 3600, 3800, 4000, 4200, 4400, 4600, 4800, 5000, or 5200 (each of the foregoing numbers is preceded by the phrase "at least about"). The maximum amount is not particularly limited, but can be less than about 5500, e.g., less than about 5200, 5000, 4800, 4600, 4400, 4200, 4000, 3800, 3600, 3400, 3200, 3000, 2800, 2600, 2400, 2200, 2100, 2000, 1900, 1800, 1700, 1600, 1500, 1400, or 1300 (each of the foregoing numbers is preceded by the phrase "less than about"). Any two of the foregoing numbers can be combined to form close-ended range, or can be used individually to define an open-ended range.

The polydispersity index (PDI) can be at least about 1, e.g., at least about 1.2, 1.4, 1.6, 1.8, 2, 2.2, 2.4, 2.6, 2.8, 3, 3.2, 3.4, 3.6, 3.8, or 4 (each of the foregoing numbers is preceded by the phrase "at least about"). The maximum amount is not particularly limited, but can be less than about 4, e.g., less than about 3.8, 3.6, 3.4, 3.2, 3, 2.8, 2.6, 2.4, 2.2, 2, 1.8, 1.6, 1.4, or 1.2 (each of the foregoing numbers is preceded by the phrase "less than about"). Any two of the foregoing numbers can be combined to form close-ended range, or can be used individually to define an open-ended range.

In some embodiments, a functionalized lignin is provided, wherein the functionalized lignin comprises an alkoxy content, except originally present aryl-methoxyl, (e.g., ethoxyl content), of about 1 to about 45 per 100 Ar; and at least one of: a) a phenolic OH content of less than about 70; and b) a β-O-4 content of at least about 10.

In some embodiments, a functionalized lignin is provided, wherein the functionalized lignin comprises an acyl content of about 1 to about 45 per 100 Ar; and at least one of: a) a phenolic OH content of less than about 70; and b) a β-O-4 content of at least about 10. The functionalized lignin may also be characterized by one or more of β-O-4 content per 100 Ar, PhOH content per 100 Ar, DC in %, Mn, Mw, PDI, or any combination thereof.

In some embodiments, a functionalized lignin is provided, wherein the functionalized lignin comprises an acyl content of about 1 to about 45 per 100 Ar; an alkoxy content, except methoxyl, (e.g., ethoxyl content), of about 1 to about 45 per 100 Ar; and at least one of: a) a phenolic OH content of less than about 70; and b) a β-O-4 content of at least about 10. The functionalized lignin may also be characterized by one or more of β-O-4 content per 100 Ar, PhOH content per 100 Ar, DC in %, Mn, Mw, PDI, or any combination thereof.

In some embodiments, the functionalized lignin is produced by the methods disclosed herein.

Functionalized lignin(s) can be incorporated into thermoplastic blends (comprising, e.g., one or more thermoplastic polymers) in various proportions, e.g., at least 1%, at least 3%, at least 5%, at least 8%, at least 10%, at least 13%, at least 15%, at least 20%, at least 25%, at least 30%, at least 35%, at least 40%, at least 45%, at least 50%, at least 55%, at least 60%, at least 65%, at least 70%, at least 75%, or at least 80%. Alternatively, or in addition, functionalized lignin(s) can be incorporated into thermoplastic blends in an amount less than 85%, e.g., less than 80%, less than 75%, less than 70%, less than 65%, less than 60%, less than 55%, less than 50%, less than 45%, less than 40%, less than 35%, less than 30%, less than 25%, less than 20%, less than 15%, less than 13%, less than 10%, less than 8%, less than 5%, or less than 3%. The aforementioned ranges can be open-ended, or can be combined into close-ended ranges. Any of the aforementioned numbers may be preceded with the word "about."

Suitable thermoplastic polymers can include, for example, a polyolefin (e.g., polyethylene and/or polypropylene), poly(methyl methacrylate), acrylonitrile butadiene styrene, nylon (i.e., a polyamide), polylatic acid, polybenzimidazole, polycarbonate, polyether sulfone, polyetherether ketone, polyetherimide, polyphenylene oxide, polystyrene, polyvinyl chloride, polytetrafluoroethylene, and any combination thereof. The blends comprising one or more functionalized lignins and one or more thermoplastic polymers can have various desirable properties (e.g., rheology, morphology, crystalline structure, mechanical properties and thermal stability).

Some embodiments of the invention are set forth in the following clauses, and any combination of these clauses, or portions of these clauses, may be made to define an embodiment of the invention:

Clause 1: a method for producing functionalized lignin, the method comprising, consisting of, or consisting essentially of: providing a residue comprising lignin and cellulose; subjecting the residue to a liquid comprising, consisting of, or consisting essentially of an organic compound, thereby forming a first mixture; wherein the subjecting is performed at a first temperature of about 100° C. or less; and wherein the first mixture comprises, consists of, or consists essentially of: a first liquid fraction comprising solubilized functionalized lignin, wherein the solubilized functionalized lignin is functionalized with the organic compound; and a first solid fraction comprising, consisting of, or consisting essentially of cellulose.

Clause 2: the method of clause 1, wherein the liquid further comprises an acid.

Clause 3: the method of clause 2, wherein the acid is present in a catalytic amount.

Clause 4: the method of clause 2 or clause 3, wherein the acid is selected from the group consisting of sulfuric acid, phosphoric acid, hydrochloric acid, hydrobromic acid, sulfurous acid, p-toluenesulfonic acid, acetic acid, formic acid, propionic acid, oxalic acid, benzoic acid, carbonic acid, butyric acid, valeric acid, caproic acid, lactic acid, malic acid, trifluoroacetic acid, trifluoromethanesulfonic acid, citric acid, and any combination thereof.

Clause 5: the method of any one of clauses 1-4, wherein the subjecting is performed at a first pressure of less than 73 bar.

Clause 6: the method of any one of clauses 1-5, wherein the subjecting is performed at atmospheric pressure.

Clause 7: the method of any one of clauses 1-6, wherein the residue is a biorefinery residue obtained from a process selected from the group consisting of enzymatic hydrolysis, acid hydrolysis, steam explosion, a treatment comprising $SO_2$, a treatment comprising $CO_2$, and any combination thereof.

Clause 8: the method of any one of clauses 1-7, further comprising separating the first liquid fraction from the first solid fraction, thereby forming a separated first liquid fraction, wherein the separated first liquid fraction contains less than about 5 wt. % cellulose on a dry solids basis.

Clause 9: the method of any one of clauses 1-8, wherein the organic compound is an alcohol.

Clause 10: the method of clause 9, wherein the alcohol is selected from the group consisting of methanol, propanol, isopropanol, butanol, pentanol, hexanol, octanol, nonanol, decanol, a polyhydric version of any aforementioned alcohol, and any combination thereof.

Clause 11: the method of clause 9, wherein the alcohol is ethanol.

Clause 12: the method of any one of clauses 1-11, wherein the organic compound is an organic acid.

Clause 13: the method of clause 12, wherein the organic acid is selected from the group consisting of a carboxylic acid, formic acid, ethanoic acid, propionic acid, butyric acid, pentanoic acid, and any combination thereof.

Clause 14: the method of clause 12, wherein the organic acid is acetic acid.

Clause 15: the method of clause 12, wherein the organic compound comprises an alcohol and an organic acid, thereby producing functionalized lignin containing both alkoxy and acyl groups.

Clause 16: the method of any one of clauses 1-15, wherein the liquid further comprises water.

Clause 17: the method of any one of clauses 1-16, wherein the subjecting is performed under reflux conditions.

Clause 18: the method of any one of clauses 1-17, wherein the method functionalizes about 1% to about 60% of the total amount of aliphatic and carboxylic OH and OR groups present on the lignin.

Clause 19: the method of any one of clauses 1-18, wherein the residue comprises less than about 20 wt. % hemicellulose, based on the dry weight of the residue.

Clause 20: the method of any one of clauses 1-19, wherein the subjecting further comprises diluting a combination of the liquid and the residue with water, thereby forming the first mixture. See, for example, FIG. 5.

Clause 21: the method of clause 20, wherein, prior to the diluting, the liquid comprises the organic compound in an amount of about 80% to about 100% by weight in water, based on the total weight of organic compound and water, and, after the diluting, the liquid comprises the organic compound in an amount of about 60% to about 80% by weight in water, based on the total weight of organic compound and water. See, for example, FIG. 5.

Clause 22: the method of any one of clauses 1-21, wherein the solubilized functionalized lignin present in the first liquid fraction is precipitated by the addition of water to the first liquid fraction. See, for example, FIG. 5.

Clause 23: the method of any one of clauses 1-22, wherein the residue is obtained by a process comprising: extracting at least a portion of hemicellulose from a lignocellulosic biomass using a first fluid comprising water, thereby forming a second mixture comprising: a second liquid fraction comprising hemicellulose; and a second solid fraction comprising treated lignocellulosic biomass; wherein the first fluid has a second temperature of at least about 110° C. and a second pressure of at least about 10 bar; exposing the treated lignocellulosic biomass to a second fluid comprising water, thereby forming a third mixture comprising: a third liquid fraction; and a third solid fraction comprising the residue; wherein the second fluid has a third temperature of at least about 350° C. and a third pressure of at least about 180 bar.

Clause 24: the method of any one of clauses 1-23, wherein the residue is obtained by a process comprising: exposing a lignocellulosic biomass to a second fluid comprising water, thereby forming a fourth mixture comprising: a fourth liquid fraction; and a fourth solid fraction comprising the residue; wherein the second fluid has a third temperature of at least about 350° C. and a third pressure of at least about 180 bar.

Clause 25: the method of clause 23 or clause 24, wherein the second fluid comprises supercritical water.

Clause 26: A functionalized lignin comprising: an ethoxyl content of about 1 to about 45 per 100 Ar; and at least one of: a) a phenolic OH content of less than about 70; and b) a β-O-4 content of at least about 10.

Clause 27: A functionalized lignin comprising: an acyl content of about 1 to about 45 per 100 Ar; and at least one of: a) a phenolic OH content of less than about 70; and a β-O-4 content of at least about 10.

Clause 28: A functionalized lignin comprising: an acyl content of about 1 to about 45 per 100 Ar; an ethoxyl content of about 1 to about 45 per 100 Ar; and at least one of: a) a phenolic OH content of less than about 70; and b) a β-O-4 content of at least about 10.

Clause 29: A thermoplastic blend comprising a thermoplastic polymer and the functionalized lignin of any one of clauses 26-28.

Clause 30: The thermoplastic blend of clause 29, wherein the thermoplastic polymer is a polyolefin.

Clause 31: The thermoplastic blend of clause 30, further comprising an additional thermoplastic polymer.

In the examples that follow, NMR spectra were acquired at 25° C. in DMSO-$d_6$. Quantitative $^{13}$C NMR spectra were acquired on a Bruker AVANCE 500 MHz spectrometer equipped with a 5 mm QNP probe using an inverse gated proton decoupling sequence (Balakshin and Capanema et al. (2015), and Capanema and Jameel et al. (2005)). Sample concentration was about 25%. Chromium (III) acetylacetonate (0.016 M) was added to the NMR tube prior to quantitative 13C NMR acquisition to provide complete relaxation of all nuclei. The acquisition parameters included a 90° pulse width, a relaxation delay of 1.7 s, and an acquisition time of 1.2 s. A total of 20,000 scans were collected. The spectra were processed and the data were calculated according to Balakshin and Capanema et al. (2015), and Capanema and Jameel et al. (2005).

2D HSQC NMR spectra were acquired at a sample concentration of about 10% on a Bruker AVANCE III 950 MHz spectrometer equipped with a cryo-platform and a Bruker 5 mm ID CPTCI (1H/13C/15N/D) cryo-probe with Z-Axis Gradient spectrometer. The acquisition parameters were as follows: 24 transient (scans per block) were acquired using 2K data points in F2 (1H) dimension for an acquisition time of 72 ms and 512 data points in F1 ($^{13}$C) dimension for an acquisition time of 5.36 ms and for a total experiment time of 4 h 20 minutes. The 2D data set was processed with 2K×2K data points using Qsine function in both dimensions.

Glass transition temperature (Tg) measurements were performed using differential scanning calorimetry (DSC) as follows. Lignin samples (about 5 mg) were weighed in duplicate into pre-weighted pans with lids and placed in the vacuum oven at 40° C. overnight. On removing the pans from the oven they are immediately hermetically sealed with a sample press and left to cool. The weight of the pan containing lignin is recorded and the pan tare weight subtracted from this to provide the weight of dry lignin in the sealed pan. Pans are loaded and run on a program consisting of the following steps: (1) Ramp at 5° C./min to 105° C.; (2) Isothermal at 105° C. for 40 min; (3) Ramp at 50° C./min to 200° C.; (4) Ramp 10° C./min to 250° C.

Molecular weights (Mw, Mn, Mz) and polydispersity index (PDI) were determined by size exclusion chromatography (SEC) following a general procedure found in Baumberger et al. (2007). More specifically, the SEC analysis was performed on an Agilent 1260 ultra HPLC, equipped with Agilent refractive index (RI) and ultraviolet (UV) detectors, with UV set to 280 nm. The column set employed three sulfonated polystyrene-divinylbenzene PSS MCX columns (a pre-column, a 1000 Å column, and a 100 000 Å column), all available from Polymer Standards Service. The mobile phase was an aqueous alkaline solution (0.1 M NaOH), and the flow rate was about 0.4-1 mL/min. The method employed six different polystyrene standards ranging from 891 g/mol to 65,400 g/mol. Each injection was performed at a concentration of about 1 mg/mL.

EXAMPLES

Example 1

Alkylation. A lignin-containing residue (SHR) was prepared in a two-step process. In the first step, comminuted hardwood biomass having a particle size below about 500 microns was mixed with a fluid comprising water to form a slurry, and the slurry was thereafter reacted at a temperature of about 155-240° C. for a period of about 30 sec to about 100 min under a pressure sufficient to keep the fluid in liquid form. In the second step, the resulting mixture from the first step was filtered, and the solids re-slurried with a fluid comprising water. This slurry was then contacted with a fluid comprising water, in which the fluid had a temperature of about 365-500° C. and a pressure of about 190-500 bar, and this contacting step brought the slurry to a temperature of about 370-450° C. The slurry was held at this temperature for a period of less than about 10 sec. The resulting mixture was filtered, and the solids ("SHR") employed in the lignin functionalization step.

A two-step process was carried out in aqueous EtOH. The first step was conducted by subjecting the obtained residue (SHR) to 99% (w/w) EtOH with a catalytic amount of H2SO4 (0.15 N) during 1 h under reflux. The high EtOH concentration was used to promote a high level of alkylation. A control experiment was run without the addition of H2SO4 for comparison purposes. In the second step, after the reaction was completed, the resulting mixture was separated by filtration and the insoluble residue extracted with fresh 70% EtOH to obtain a maximum extraction yield of the modified lignin. The dissolved lignins were precipitated from the solutions by dilution with water to decrease the EtOH concentration to about 10-15%. The isolated lignins were characterized with comprehensive quantitative $^{13}$C NMR methods for molecular structure and size exclusion chromatography (SEC) for molecular weight (MW) determination (Table 1). The sample names in Table 1 indicate the extraction/functionalization conditions. For example, the number indicates the percent (w/w) organic solvent in water, and the presence or absence of "H" indicates whether acid was used. In other words, EHL-99 was extracted/functionalized using 99% EtOH in 1% water (w/w), along with the addition of acid. On the other hand EL-99 was extracted/functionalized with the same solvent system, but without the addition of acid. This information can be used to decode the rest of the samples for the alkylation reactions. Alcell lignin was obtained commercially.

It has been shown that about 60% of the total amount of lignin can be isolated over two steps, but further optimization can likely increase this yield. All lignins were of a very high purity with extremely low carbohydrate content (<1%). In the first step, the degree of alkylation was about 23 ethoxy (EtO) groups per 100 aromatic rings (Ar) (EHL-99). In the second step, the lignin extracted with 70% EtOH (EHL-70) had somewhat less EtO-content, but still a significant amount around about 17 EtO per 100Ar. Lignins extracted without H$_2$SO$_4$ addition (EL-99 and EL-70) had very little EtO group content. The techniques utilized to characterize the lignins is the same as disclosed in U.S. Patent Application Publication 2014/0275501, and are also disclosed hereinabove.

TABLE 1

Characterization of derivatized lignin

| Lignin | EHL-99 | EHL-70 | EL-99 | EL-70 | AcHL-85 | AcL-85 | Alcell |
|---|---|---|---|---|---|---|---|
| Yield, % | 33.9 | 26.1 | 23.7 | 26.0 | 73.5 | 67.5 | NA |
| EtO, per 100 Ar | 23 | 17 | 3 | 2 | — | — | 13 |
| Ac, per 100 Ar | — | — | — | — | 23 | 12 | — |
| β-O-4, per 100Ar | 12 | 14 | 14 | 16 | 2 | 10 | 8 |
| PhOH, per 100Ar | 74 | 63 | 75 | 66 | 79 | 69 | 72 |
| DC, % | 40 | 33 | 33 | 35 | 51 | 44 | 33 |
| Mn, Da | 622 | 948 | 704 | 963 | 1317 | 1072 | 792 |
| Mw, Da | 1531 | 2350 | 1516 | 2089 | 4644 | 3856 | 2117 |
| PDI | 2.46 | 2.48 | 2.15 | 2.17 | 3.53 | 3.60 | 2.67 |

NA: not applicable;
DC: degree of condensation;
Mn: number average MW;
Mw: weight average MW;

The molecular weight of EHL-70 and EL-70 was higher than that of the corresponding EHL-99 and EL-99 due to better solubility of high molecular weight fractions in 70% EtOH as compared to 99% EtOH. Notably, the solubility of lignin increases from 100% ethanol to 70% ethanol, and then decreases again as the water content increases. It is noteworthy to mention that the polydispersity index (PDI) was rather low for the lignin fractions, demonstrating it may be possible to obtain lignin derivatives with specific narrow characteristics, which are desired for many lignin applications.

Structural analysis and the molecular weight data showed that under the conditions employed, lignin modification was limited to the alkylation reaction with very little side reactions (e.g., degradation and condensation/repolymerization). However, other lignin characteristics could potentially be manipulated, if desired, under more severe conditions Example 2

Acylation. Residue (SHR) was produced as described in Example 1. The acylation was conducted similarly to the alkylation process, but in one step by refluxing for one hour using 85% acetic acid with and without a catalytic amount of H2SO4 (0.15 N). The lignins were precipitated and analyzed in a similar manner to the alkylated lignins (Table 1). Acylated lignins in amounts of about 75% and 67% were isolated in the experiment with (AcHL) and without (AcL) addition of H2SO4, respectively. About 23 acyl (Ac) groups per 100 Ar were introduced into AcHL, and about 12 Ac per 100 Ar were introduced into AcL. In contrast to the alkylation process, significant lignin modification was observed in the acylation experiments, especially in the experiment with addition of H2SO4 (significant decrease in b-O-4 units, increase in both PhOH and degree of lignin condensation). The molecular weight values of the lignins were also higher than EtOH extracted lignins. This shows that the reaction conditions can regulate not only the degree of acylation, but also other lignin characteristics, if desired.

While the preferred forms of the invention have been disclosed, it will be apparent to those skilled in the art that various changes and modifications may be made that will achieve some of the advantages of the invention without departing from the spirit and scope of the invention. Therefore, the scope of the invention is to be determined solely by the claims to be appended.

When ranges are used herein for physical properties, such as molecular weight, or chemical properties, such as chemical formulae, all combinations, and subcombinations of ranges specific embodiments therein are intended to be included.

The disclosures of each patent, patent application, and publication cited or described in this document are hereby incorporated herein by reference, in their entirety.

Those skilled in the art will appreciate that numerous changes and modifications can be made to the preferred embodiments of the invention and that such changes and modifications can be made without departing from the spirit of the invention.

REFERENCES

1. S. Kubo, J. F. Kadla. *Macromolecules* 2004, 37, 6904, herein incorporated by reference in its entirety.
2. Y. Li and S. Sarkanen. Macromolecules 2002, 35, 9707, herein incorporated by reference in its entirety.
3. H. Sadeghifar et al. Ind. Eng. Chem. Res. 2012, 51, 16713, herein incorporated by reference in its entirety.
4. W. G. Glasser and R. K. Jain. Holzforschung 1993, 47, 225, herein incorporated by reference in its entirety.
5. Toriz G, Denes F, Young R A; Polymer Composites 23(5) (2002) 806-813, herein incorporated by reference in its entirety.
6. C. Pouteau, et al. Polymer Degradation and Stability 2003, 81, 9, herein incorporated by reference in its entirety.
7. G. Cazacu et al. Macromolecular Materials and Engineering 2004, 289, 880, herein incorporated by reference in its entirety.
8. S. Kubo, J. F. Kadla, Macromolecules 2003, 36, 7803, herein incorporated by reference in its entirety.
9. S. Kubo, J. F. Kadla, Journal of Applied Polymer Sci. 2005, 98, 1437, herein incorporated by reference in its entirety.
10. P. R, V. Villani, et al. Journal of Applied Polymer Sci. 2008, 109, 309, herein incorporated by reference in its entirety.
11. H. Nitz et al. Journal of Applied Polymer Sci. 2001, 32, 656, herein incorporated by reference in its entirety.
12. Holladay, J. E., J. F. White, et al. (2007). Volume II—Results of Screening for Potential Candidates from Biorefinery Lignin. Top Value-Added Chemicals from Biomass, Pacific Northwest National Laboratory (PNNL) and the National Renewable Energy Laboratory (NREL), herein incorporated by reference in its entirety.
13. Ragauskas, A. J. et al. (2014) Science, 344: 1246843. DOI:10.1126/science.1246843, herein incorporated by reference in its entirety.
14. 3. Glasser, W. (2000). Lignin: Historical, Biological, and Material Perspectives. W. Glasser, R. Northey and T. Schultz. Washington, D.C.: 216-238, herein incorporated by reference in its entirety.
15. 4. Gosselink, R., E. de Jong, et al. (2004). Industrial Crops and Products 20: 121-129.
16. Baker, D. and T. Rials (2013) Journal of Applied Polymer Science DOI: 10.1002/APP.39273, herein incorporated by reference in its entirety.
17. Lora, J. and W. Glasser (2002). Journal of Polymers and the Environment 10(1-2): 39-48, herein incorporated by reference in its entirety.
18. Glasser, W., C. Barnett, et al. (1983). Journal of Agricultural and Food Chemistry 31(5): 921-930, herein incorporated by reference in its entirety.
19. ACS (1999). Lignin: historical, biological, and materials perspectives. Washington, D.C., American Chemical Society, herein incorporated by reference in its entirety.
20. Y. Li and S. Sarkanen. Macromolecules 2005, 38, 2296-2306, herein incorporated by reference in its entirety.
21. Kosikova, B.; Duris, M.; Demianova, V. European Polymer Journal (2000), 36(6), 1209-1212, herein incorporated by reference in its entirety.
22. Efanov, M. V. Transformations of aspen wood and its principal components by O-acylation Chemistry of Natural Compounds (Translation of Khimiya Prirodnykh Soedinenii). (2002), 37(5), 482-485, herein incorporated by reference in its entirety.
23. Pan, X.-J.; Sano, Y. Holzforschung (1999), 53(5), 511-518, herein incorporated by reference in its entirety.
24. Pye, E. Kendall; Lora, Jairo H. Tappi Journal (1991), 74(3), 113-18, herein incorporated by reference in its entirety.
25. Chen, Feng; Dai, Honghu; Dong, Xiaoli; Yang, Jintao; Zhong, Mingqiang. Polymer Composites (2011), 32(7), 1019-1025, herein incorporated by reference in its entirety.
26. Mörck, R., H. Yoshida, et al. (1986). Holzforschung (Suppl. 51-60), herein incorporated by reference in its entirety.
27. Capanema and Jameel et al. (2005) Proc. 13th ISWFPC, Auckland, New Zealand, v.III, 57-64. "Isolation and characterization of residual lignins from hardwood pulps: Method improvements," incorporated herein by reference in its entirety.
28. Capanema and Kadla et al. (2005) J. Agric. Food Chem. 53, 9639-9649 "Quantitative Characterization of a Hardwood Milled Wood Lignin by NMR Spectroscopy," incorporated herein by reference in its entirety.
29. Balakshin and Capanema et al. (2015) (Holzforschung, "Structural analysis of hardwood native lignins by quantitative 13C NMR spectroscopy," article available online DOI: 10.1515/hf-2014-0328)

What is claimed:

1. A method for producing a functionalized lignin, the method comprising:
    exposing a biomass to a first fluid comprising water, thereby forming a first mixture comprising:
        a first liquid fraction; and
        a first solid fraction comprising a residue, wherein the residue comprises lignin and cellulose;
        wherein the first fluid has a first temperature of at least about 350° C. and a first pressure of at least about 180 bar; and
    subjecting the residue to a liquid comprising an organic compound, thereby forming a second mixture, wherein the subjecting is performed at a second temperature of about 100° C. or less and for a time of less than about 225 minutes, and wherein the second mixture comprises:
        a second liquid fraction comprising a solubilized functionalized lignin functionalized with the organic compound; and
        a second solid fraction comprising cellulose.

2. The method of claim 1, wherein the subjecting further comprises diluting a combination of the liquid and the residue with water, thereby forming the second mixture.

3. The method of claim 2, wherein, prior to the diluting, the liquid comprises the organic compound in an amount of from about 80% to about 100% by weight in water, based on the total weight of the organic compound and water, and wherein, after the diluting, the liquid comprises the organic compound in an amount of from about 60% to about 80% by weight in water, based on the total weight of the organic compound and water.

4. The method of claim 1, wherein the first fluid comprises supercritical water.

5. The method of claim 1, wherein the biomass comprises of from about 55 wt % cellulose to about 60 wt % cellulose and of from about 36 wt % to about 40 wt % lignin, based on the total weight of the biomass.

6. The method of claim 1, wherein the biomass is a lignocellulosic biomass.

7. The method of claim 1, wherein the biomass is a treated lignocellulosic biomass obtained by a process comprising extracting at least a portion of hemicellulose from a lignocellulosic biomass using a second fluid comprising water, thereby forming a third mixture comprising:
    a third liquid fraction comprising hemicellulose; and
    a third solid fraction comprising the treated lignocellulosic biomass,
    wherein the second fluid has a third temperature of at least about 110° C. and a second pressure of at least about 10 bar.

8. The method of claim 1, wherein the liquid further comprises an acid.

9. The method of claim 8, wherein the acid is present in a catalytic amount.

10. The method of claim 8, wherein the acid is selected from sulfuric acid, phosphoric acid, hydrochloric acid, hydrobromic acid, sulfurous acid, p-toluenesulfonic acid, acetic acid, formic acid, propionic acid, oxalic acid, benzoic acid, carbonic acid, butyric acid, valeric acid, caproic acid, lactic acid, malic acid, trifluoroacetic acid, trifluoromethanesulfonic acid, and citric acid, or a combination thereof.

11. The method of claim 1, further comprising separating the second liquid fraction from the second solid fraction, thereby forming a separated first liquid fraction, wherein the separated first liquid fraction contains less than about 5 wt. % cellulose on a dry solids basis.

12. The method of claim 1, wherein the organic compound comprises one or more of an alcohol, an organic acid, or both.

13. The method of claim 12, wherein the organic compound comprises an alcohol selected from methanol, ethanol, propanol, isopropanol, butanol, pentanol, hexanol, octanol, nonanol, and decanol, or a combination thereof.

14. The method of claim 12, wherein the organic compound comprises an organic acid selected from formic acid, acetic acid, ethanoic acid, propionic acid, butyric acid, and pentanoic acid, or a combination thereof.

15. The method claim 12, wherein the organic compound comprises an alcohol and an organic acid.

16. The method of claim 1, wherein the subjecting is performed at a third pressure of less than 73 bar.

17. The method of claim 1, wherein the subjecting is performed at atmospheric pressure.

18. The method of claim 1, wherein the residue comprises less than about 20 wt. % hemicellulose, based on the dry weight of the residue.

19. The method of claim 1, wherein the liquid comprises the organic compound in an amount of from about 80% to about 100% by weight in water, based on the total weight of the organic compound and water.

20. The method of claim 1, wherein the first fluid comprises supercritical water.

21. The method of claim 1, wherein the method functionalizes about 1% to about 60% of the total amount of aliphatic and carboxylic OH and OR groups present on the lignin.

* * * * *